United States Patent
Uchida

(10) Patent No.: US 11,428,858 B2
(45) Date of Patent: Aug. 30, 2022

(54) OPTICAL ELEMENT, OPTICAL SYSTEM, AND IMAGE PICKUP APPARATUS

(71) Applicant: CANON KABUSHIKI KAISHA, Tokyo (JP)

(72) Inventor: Kazue Uchida, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 237 days.

(21) Appl. No.: 16/892,420

(22) Filed: Jun. 4, 2020

(65) Prior Publication Data

US 2020/0386929 A1 Dec. 10, 2020

(30) Foreign Application Priority Data

Jun. 7, 2019 (JP) .............................. JP2019-107242

(51) Int. Cl.
*G02B 5/20* (2006.01)
*G01S 7/481* (2006.01)

(52) U.S. Cl.
CPC ............ *G02B 5/208* (2013.01); *G01S 7/4816* (2013.01)

(58) Field of Classification Search
CPC .............................. G02B 5/208; G01S 7/4816
See application file for complete search history.

(56) References Cited

U.S. PATENT DOCUMENTS

| | | | |
|---|---|---|---|
| 2018/0029530 A1* | 2/2018 | Nichols | ................... C23C 14/34 |
| 2020/0076152 A1* | 3/2020 | Eichenholz | ........ G02B 26/0816 |
| 2021/0055462 A1* | 2/2021 | Kweon | ................... C23C 28/42 |

FOREIGN PATENT DOCUMENTS

| | | |
|---|---|---|
| CN | 101105547 A | 1/2008 |
| CN | 202256725 U | 5/2012 |
| CN | 103827705 A | 5/2014 |
| CN | 104871047 A | 8/2015 |
| CN | 104903760 A | 9/2015 |
| CN | 108008479 A | 5/2018 |
| CN | 108196338 A | 6/2018 |
| JP | 2000329933 A | 11/2000 |
| JP | 2006023602 A | 1/2006 |
| JP | 2014203063 A | 10/2014 |
| JP | 2019028421 A | 2/2019 |
| WO | 2006117979 A1 | 11/2006 |

* cited by examiner

*Primary Examiner* — Mary Ellen Bowman
(74) *Attorney, Agent, or Firm* — Rossi, Kimms & McDowell LLP

(57) ABSTRACT

An optical element includes a substrate, and a multilayer film provided on the substrate. The multilayer film has an average transmittance of 75% or higher for light having a wavelength of 470 nm to 630 nm incident at an incident angle of 0° and a transmittance of 10% or lower for light having a wavelength of 1550 nm incident at an incident angle of 0°. The multilayer film includes a layer made of a first material and a layer made of a second material alternately layered, and a final layer made of a third material disposed on an outermost side, and a predetermined condition is satisfied.

10 Claims, 24 Drawing Sheets

OPTICAL ELEMENT, OPTICAL SYSTEM, AND IMAGE PICKUP APPARATUS

BACKGROUND OF THE INVENTION

Field of the Invention

The present invention relates to an optical element, an optical system, and an image pickup apparatus.

Description of the Related Art

LiDAR (Light Detection and Ranging) is a technology for measuring a time for an irradiated laser beam to hit an object and to return back from the object, and for measuring a distance and direction to the object. In order to observe a distant object, it is necessary to increase the intensity of the laser beam, but the intensified laser beam may damage the human retina. On the other hand, the laser beam having a wavelength of 1550 nm is absorbed by water and thus the laser beam hitting a human eyeball, if any, would be absorbed by water in the eyeball and does not reach the retina. Thus, in recent years, a laser beam having a wavelength of 1550 nm has been increasingly used for the LiDAR.

Digital cameras use an image sensor having a sensitivity to wavelengths from 200 nm to 1100 nm including the visible range. An optical element that cuts light in an ultraviolet band having a wavelength of 420 nm or lower and an infrared band having a wavelength of 680 nm or higher may be disposed on the front surface of the image sensor in order to make the sensitivity equal to that of the human eye.

Japanese Patent Laid-Open No. ("JP") 2019-28421 discloses an optical filter having an average transmittance of 80% or higher from a wavelength of 425 nm to 620 nm and a maximum transmittance of 12.5% or lower from a wavelength of 700 nm to 1200 nm.

When the LiDAR and the digital camera are used in the same place, if the laser beam having a high-intensity wavelength of 1550 nm used for the LiDAR reaches the image sensor while maintaining its intensity, the image sensor may get damaged. JP 2019-28421 is silent about a characteristic of an optical filter at a wavelength of 1550 nm. It is assumed that the optical filter disclosed in JP 2019-28421 does not absorb much the wavelength of 1550 nm due to the facts that it uses a light absorbing material instead of the interference by a dielectric multilayer film, and the transmittance increases from a wavelength of 1100 nm to 1200 nm. Therefore, it is unclear whether the image sensor can be prevented from getting by the laser beam having the wavelength of 1550 nm when the optical filter disclosed in JP 2019-28421 is disposed on the front surface of the image sensor.

SUMMARY OF THE INVENTION

The present invention provides an optical element, an optical system, and an image pickup apparatus, each of which cuts light having a wavelength of 1550 nm while maintaining a high transmittance in a visible range.

An optical element according to one aspect of the present invention includes a substrate, and a multilayer film provided on the substrate. The multilayer film has an average transmittance of 75% or higher for light having a wavelength of 470 nm to 630 nm incident at an incident angle of 0° and a transmittance of 10% or lower for light having a wavelength of 1550 nm incident at an incident angle of 0°. The multilayer film includes a layer made of a first material and a layer made of a second material alternately layered, and a final layer made of a third material disposed on an outermost side. The following conditional expressions are satisfied:

$$1.35 \leq n_m \leq 1.80$$

$$1.90 \leq n_h \leq 2.50$$

$$1.15 \leq n_l \leq 1.50$$

where $n_m$ is a refractive index of the first material, $n_h$ is a refractive index of the second material, and $n_l$ is a refractive index of the third material.

An optical element according to another aspect of the present invention includes a substrate, and a multilayer film provided on the substrate. The multilayer film has an average transmittance of 75% or higher for light having a wavelength of 470 nm to 630 nm incident at an incident angle of 0° and a transmittance of 10% or lower for light having a wavelength of 1550 nm incident at an incident angle of 0°. There are m/8 or more integers that satisfy the following conditional expressions:

$$480 \leq d_{2i-1} \leq 600$$

$$1.8 \leq d_{2i}/d_{2i-1} \leq 2.2$$

where m is an order of a layer in the multilayer film counted from a side of the substrate, i is an integer satisfying $2 \leq i \leq (m-1)/2$, $d_{2i-1}$ (nm) is an optical thickness of a (2i−1)-th layer, and $d_{2i}$ (nm) is an optical thickness of a 2i-th layer.

An optical system and an image pickup apparatus each having one of the above optical elements also constitute another aspect of the present invention.

Further features of the present invention will become apparent from the following description of exemplary embodiments with reference to the attached drawings.

DESCRIPTION OF THE EMBODIMENTS

Figure 1:
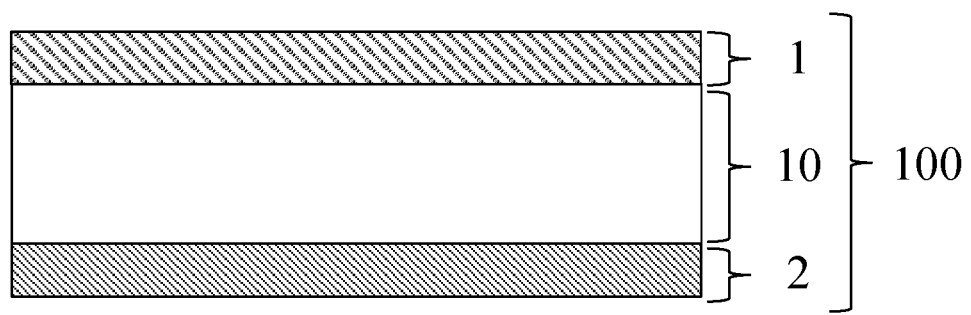
FIG. 1 is a schematic sectional view of an optical element according to one embodiment of the present invention.

Referring now to the accompanying drawings, a detailed description will be given of embodiments according to the present invention. Corresponding elements in respective figures will be designated by the same reference numerals, and a duplicate description thereof will be omitted.

FIG. 1 is a schematic sectional view of an optical element 100 according to one embodiment of the present invention. The optical element 100 includes a transparent substrate (substrate) 10 that has an optical multilayer film (multilayer film) 1 having a transmittance characteristic on one optical surface (first surface) and an optical multilayer film (multilayer film) 2 on the other optical surface (second surface), and serves to select a wavelength. The optical multilayer film 2 is determined according to the intended application, and may have any film structures.

The following description of the transmittance characteristic will discuss light having a wavelength of 300 nm to 1800 nm incident on the optical element 100 at an incident angle of 0° (degree).

The optical multilayer film 1 has an average transmittance of 75% or higher in the visible wavelength range of 470 nm to 630 nm, and has a transmittance of 10% or lower at a wavelength of 1550 nm used for the LiDAR. The optical multilayer film 1 may have an average transmittance of 80% or higher at a wavelength of 420 nm to 680 nm and a transmittance of 5% or lower at a wavelength of 1550 nm.

The optical multilayer film 1 may have a band having a transmittance of 10% or lower from a wavelength of 700 nm to 1000 nm. By having such a band, the optical multilayer film 1 can have a film structure showing an average transmittance of 80% or higher at a wavelength of 420 nm to 680 nm and a transmittance of 10% or lower at a wavelength of 1550 nm, with the small number of layers and materials.

A difference between a maximum reflectance and a minimum reflectance at a wavelength of 470 nm to 630 nm of the optical multilayer film 1 may be within 8%. In the visible range, if the difference in reflectance at each wavelength is large, the color balance will get worse.

The number of layers of the optical multilayer film 1 may be 14 or larger and 81 or smaller. When the number of layers is smaller than 14, it is difficult to obtain the desired transmittance characteristic. When the number of layers is 82 or larger, the influence of characteristic scattering due to film thickness errors in forming each layer becomes large, making the manufacture difficult. The number of layers may be 20 or larger and 61 or smaller, and particularly 30 or larger and 51 or smaller.

The optical multilayer film 1 is made of three types of film materials having refractive indexes of $n_m$, $n_h$, and $n_l$, respectively. The optical multilayer film 1 includes, in order from the front surface of the transparent substrate 10, a repetitive layer (alternating layer) in which a first material having the refractive index of $n_m$ and a second material having the refractive index of $n_h$ are alternately repeated, and a final layer made of a third material having the refractive index of $n_l$. The refractive indexes $n_m$, $n_h$, and $n_l$ may satisfy the following conditional expressions (1) to (3), respectively.

$$1.35 \leq n_m \leq 1.80 \tag{1}$$

$$1.90 \leq n_h \leq 2.50 \tag{2}$$

$$1.15 \leq n_l \leq 1.50 \tag{3}$$

The refractive indices $n_m$, $n_h$, and $n_l$ simultaneously satisfy the relationship of $n_l < n_m < n_h$. In the actual manufacture, the cost increases if there are many materials or if a material having a special refractive index is used. Hence, a generally used material may be produced with a small number of types and the small number of layers.

The numerical ranges of the conditional expressions (1) to (3) may be respectively set to the ranges of the following conditional expressions (1a) to (3a).

$$1.39 \leq n_m \leq 1.75 \tag{1a}$$

$$1.95 \leq n_h \leq 2.45 \tag{2a}$$

$$1.19 \leq n_l \leq 1.45 \tag{3a}$$

In particular, the numerical ranges of the conditional expressions (1) to (3) may be respectively set to the ranges of the following conditional expressions (1b) to (3b).

$$1.40 \leq n_m \leq 1.70 \tag{1b}$$

$$2.00 \leq n_h \leq 2.40 \tag{2b}$$

$$1.23 \leq n_l \leq 1.40 \tag{3b}$$

Where m is an order of a layer in the optical multilayer film 1 counted from a side of the substrate (a substrate side), "i" is an integer satisfying $2 \leq i \leq (m-1)/2$, $d_{2i-1}$ (nm) is an optical thickness of a (2i−1)-th layer, and $d_{2i}$ (nm) is an optical thickness of a 2i-th layer, there may be at least m/8 integers that satisfy the following conditional expressions (4) and (5).

$$480 \leq d_{2i-1} \leq 600 \tag{4}$$

$$1.8 \leq d_{2i}/d_{2i-1} \leq 2.2 \tag{5}$$

In order for the optical multilayer film 1 to transmit light having a wavelength of 470 nm to 630 nm and to cut (or filter) light having a wavelength of 1550 nm, it is necessary to satisfy the expressions (4) and (5).

While this embodiment assumes the light is introduced from the optical multilayer film 1, the light may be introduced from the optical multilayer film 2.

Figure 2:
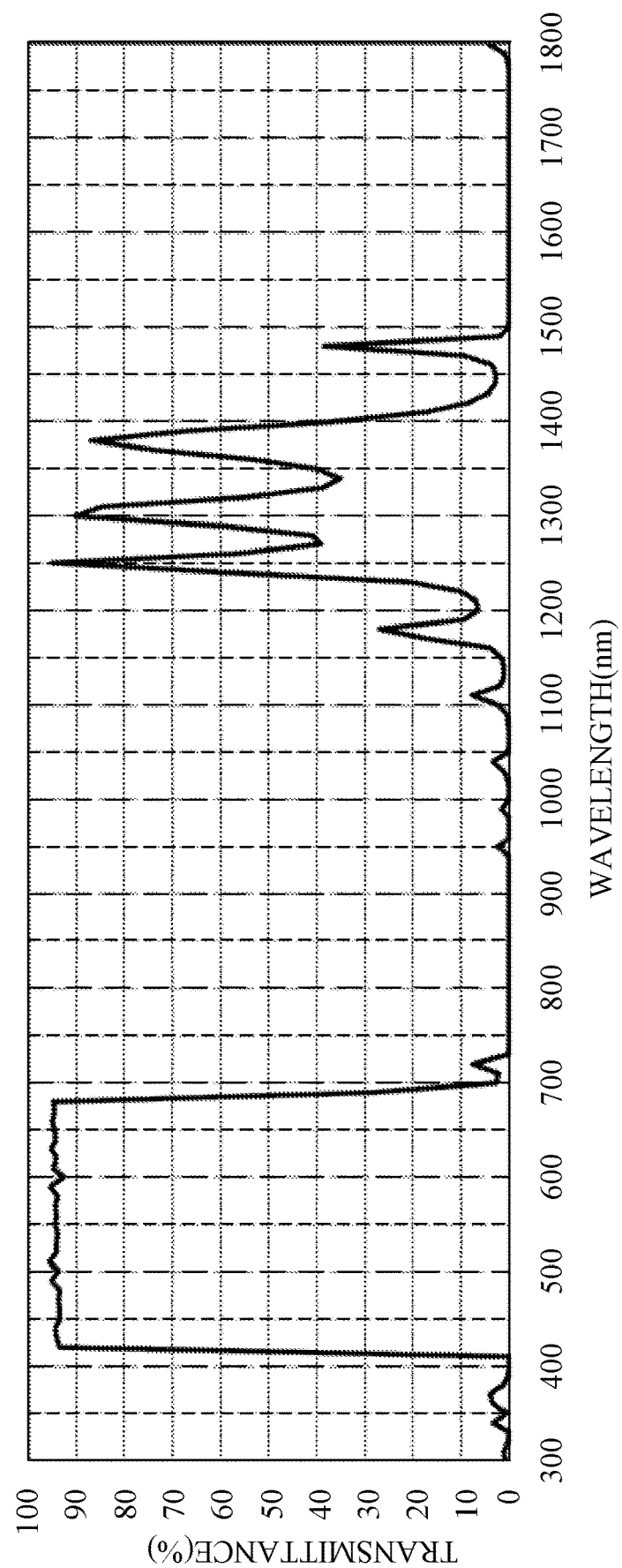
FIG. 2 illustrates a transmittance characteristic of an optical element (Example 4).

FIG. 2 illustrates a transmittance characteristic of the optical element 100. The optical element 100 has an average transmittance of 80% or higher at a wavelength of 420 nm to 680 nm, and has a transmittance of 10% or lower at a wavelength of 1550 nm. The optical element 100 has a transmittance of 10% or lower even in a wavelength band of 300 nm to 400 nm, which is a UV band, and a wavelength band of 700 nm to 1100 nm, which is an IR band. However, the present invention is not limited to this embodiment because the necessary transmittance is different depending on the application.

The optical element 100 may be located at any position on the optical axis of the optical system as long as the optical element 100 is located on the front surface of the image sensor, but may be located closer to the image sensor.

Figure 3A:
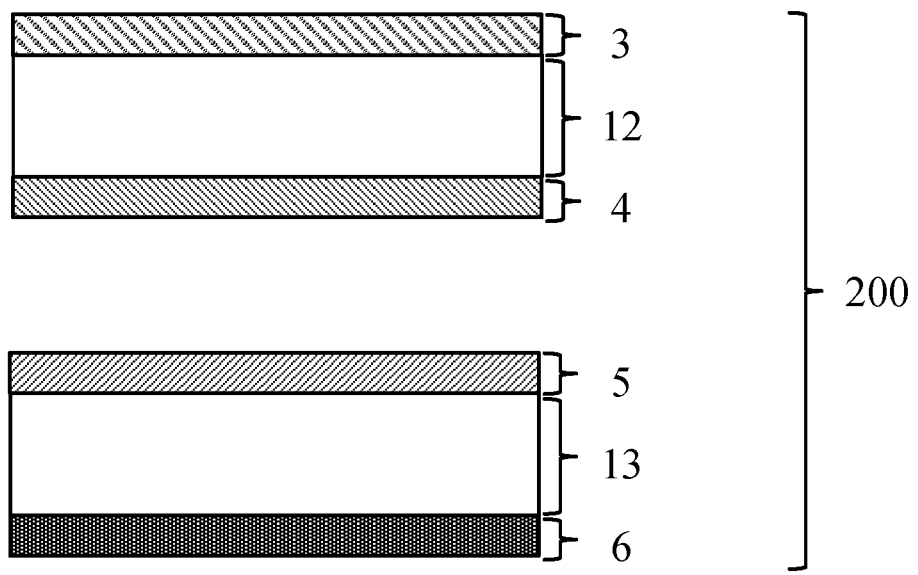
FIGS. 3A and 3B are schematic sectional views of optical elements different from an optical element illustrated in FIG. 1.
Figure 3B:
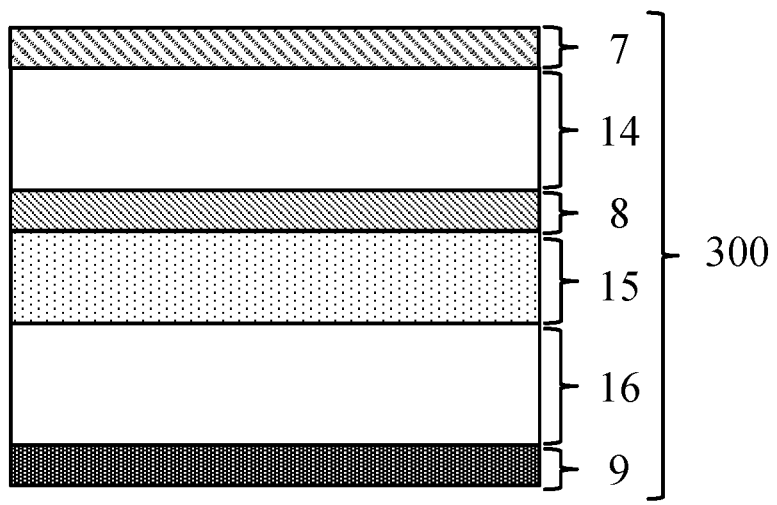

FIGS. 3A and 3B are schematic sectional views of an optical element different from the optical element 100 of FIG. 1. An optical element 200 illustrated in FIG. 3A includes a transparent substrate 12 having an optical multi-layer film 3 on one optical surface and an optical multilayer film 4 on the other optical surface, and a transparent substrate 13 having an optical multilayer film 5 on one optical surface and an optical multilayer film 6 on the other optical surface. The transparent substrates 12 and 13 are arranged on the optical axis. An optical element 300 illustrated in FIG. 3B has a transparent substrate 14 having an optical multi-layer film 7 on one optical surface and an optical multilayer film 8 on the other optical surface, and a transparent substrate 16 having an optical multilayer film 9 on one optical surface. The transparent substrates 14 and 16 are adhered to each other via an adhesive 15.

The optical element according to the present invention is not limited to the configuration described in this embodiment, but may be configured according to the application.

Specific examples will be demonstrated below. The following examples are merely illustrative, and the optical element according to the present invention is not limited to the conditions of each example.

Example 1

The optical element 100 according to this example has the configuration illustrated in FIG. 1. The transparent substrate 10 is made of a glass material S1 having a refractive index ($\lambda$=550 nm) of 1.52 and no absorption. The optical multi-layer film 1 is a first 1550 nm cutting film having a function of cutting (blocking) 90% or higher of light having the wavelength of 1550 nm used for the LiDAR. The optical multilayer film 2 is a visible-range antireflection film that transmits light in the wavelength range of 420 nm to 680 nm, which is the visible range. Table 1 shows the film structure of the first 1550 nm cutting film and Table 2 shows the film structure of the visible-range antireflection film. The refractive indexes in Tables 1 and 2 are values at the wavelength of 550 nm. The first 1550 nm cutting film includes a repetitive layer in which a film material M1 and a film material H1 are alternately repeated, and a final layer made of a film material L1. The visible-range antireflection film 2 has a three-layer structure made of film materials M2, H1, and L1.

Figure 4:
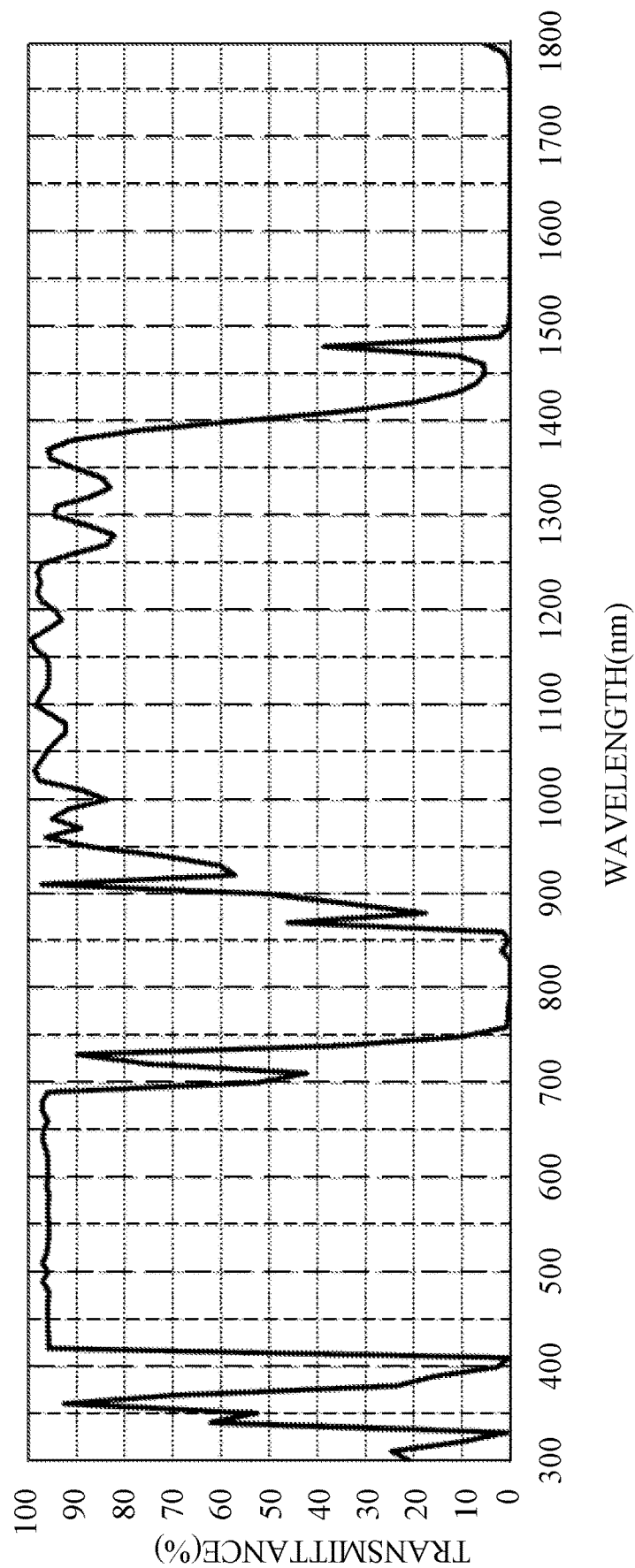
FIG. 4 illustrates a transmittance characteristic of a first 1550 nm cutting film (Examples 1 to 7).
Figure 5:
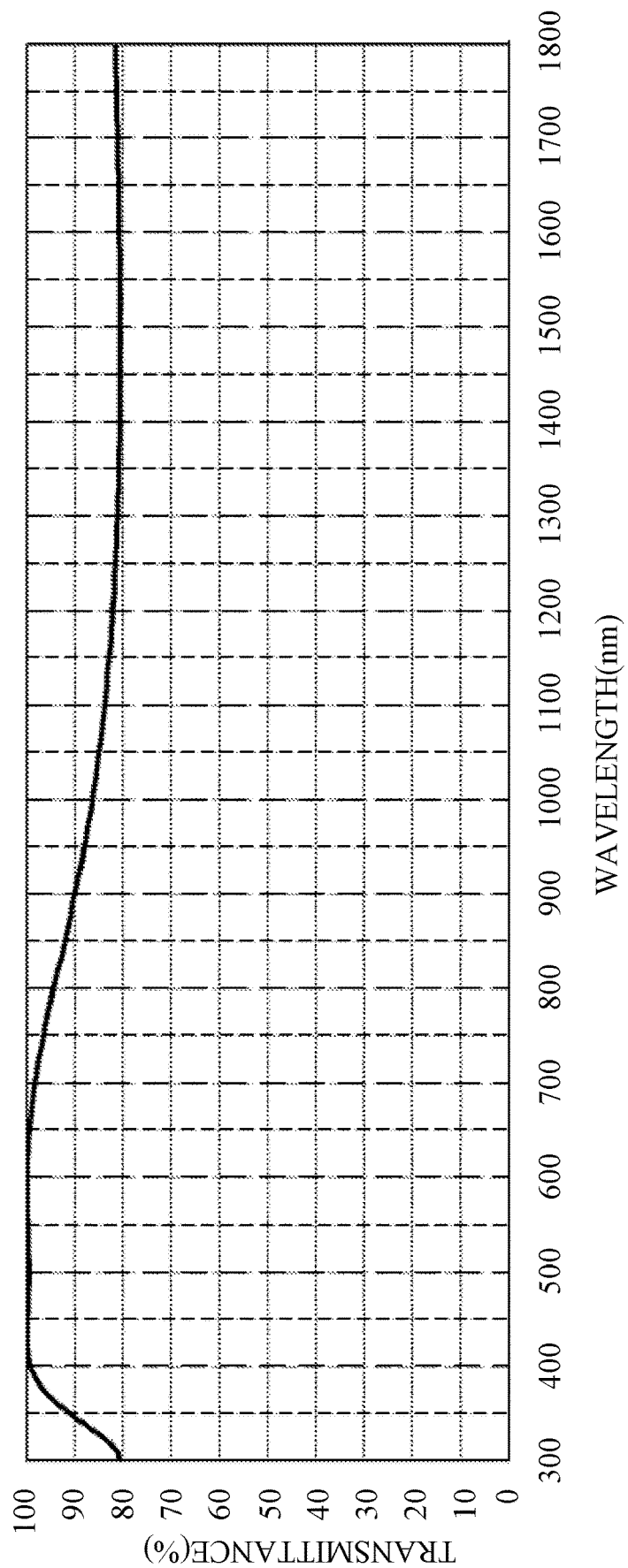
FIG. 5 illustrates a transmittance characteristic of a visible-range antireflection film (Examples 1 and 5).

The refractive indices of the film materials M1, H1, and L1 of the 1550 nm cutting film 1 satisfy the expressions (1) to (3), respectively. There are at least six or higher integers i that satisfy the expressions (4) and (5). FIG. 4 illustrates the transmittance characteristics of the first 1550 nm cutting film. The first 1550 nm cutting film has an average trans-mittance of 80% or higher at a wavelength of 420 nm to 680 nm, and has a transmittance of 10% or lower at a wavelength of 1550 nm. FIG. 5 illustrates the transmittance characteristic of the visible-range antireflection film.

Figure 6:
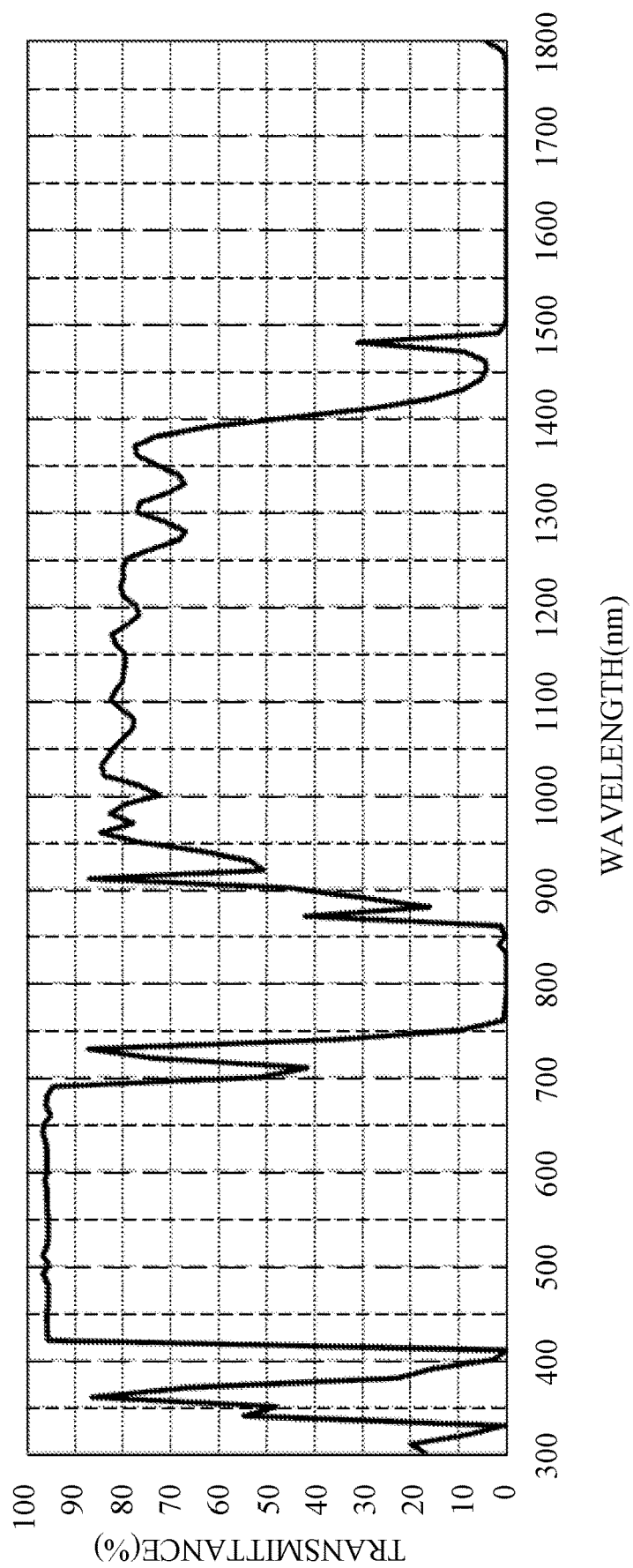
FIG. 6 illustrates a transmittance characteristic of the optical element according to Example 1.

The transmittance characteristic of the optical element 100 according to this example is a product of the transmittance characteristic of the first 1550 nm cutting film and the transmittance characteristic of the visible-range antireflection film. FIG. 6 illustrates the transmittance characteristic of the optical element 100 according to this example. The optical element 100 according to this example has an average transmittance of 80% or higher at the wavelength of 420 nm to 680 nm. The optical element 100 has a transmittance of 10% or lower at the wavelength of 1550 nm. That is, the optical element 100 can cut light having the wavelength of 1550 nm. The optical element 100 may have a transmittance of 5% or lower, particularly 3% or lower, at the wavelength of 1550 nm.

TABLE 1

| Layer | Material | Refractive index | Optical film thickness (nm) |
|---|---|---|---|
| 41st | L1 | 1.38 | 151.6 |
| 40th | H1 | 2.12 | 564.7 |
| 39th | M1 | 1.46 | 274.8 |
| 38th | H1 | 2.12 | 563.9 |
| 37th | M1 | 1.46 | 265.8 |
| 36th | H1 | 2.12 | 552.1 |
| 35th | M1 | 1.46 | 261.0 |
| 34th | H1 | 2.12 | 537.8 |
| 33rd | M1 | 1.46 | 257.3 |
| 32nd | H1 | 2.12 | 547.2 |
| 31st | M1 | 1.46 | 265.6 |
| 30th | H1 | 2.12 | 538.9 |
| 29th | M1 | 1.46 | 269.8 |
| 28th | H1 | 2.12 | 549.6 |
| 27th | M1 | 1.46 | 260.5 |
| 26th | H1 | 2.12 | 536.0 |
| 25th | M1 | 1.46 | 267.8 |
| 24th | H1 | 2.12 | 558.1 |
| 23rd | M1 | 1.46 | 282.4 |
| 22nd | H1 | 2.12 | 596.3 |
| 21st | M1 | 1.46 | 258.3 |
| 20th | H1 | 2.12 | 569.3 |
| 19th | M1 | 1.46 | 274.0 |
| 18th | H1 | 2.12 | 571.3 |
| 17th | M1 | 1.46 | 271.0 |
| 16th | H1 | 2.12 | 528.9 |
| 15th | M1 | 1.46 | 247.8 |
| 14th | H1 | 2.12 | 506.6 |
| 13th | M1 | 1.46 | 244.1 |
| 12th | H1 | 2.12 | 524.2 |
| 11th | M1 | 1.46 | 238.2 |
| 10th | H1 | 2.12 | 522.5 |
| 9th | M1 | 1.46 | 257.9 |
| 8th | H1 | 2.12 | 541.9 |
| 7th | M1 | 1.46 | 264.3 |
| 6th | H1 | 2.12 | 542.7 |
| 5th | M1 | 1.46 | 260.4 |
| 4th | H1 | 2.12 | 539.8 |
| 3rd | M1 | 1.46 | 258.9 |
| 2nd | H1 | 2.12 | 542.5 |
| 1st | M1 | 1.46 | 70.4 |
| Substrate | S1 | 1.52 | |

TABLE 2

| | Material | Refractive index | Optical film thickness (nm) |
|---|---|---|---|
| 3rd layer | L1 | 1.38 | 125 |
| 2nd layer | H1 | 2.12 | 250 |
| 1st layer | M2 | 1.60 | 125 |
| Substrate | S1 | 1.52 | |

Example 2

Figure 7:
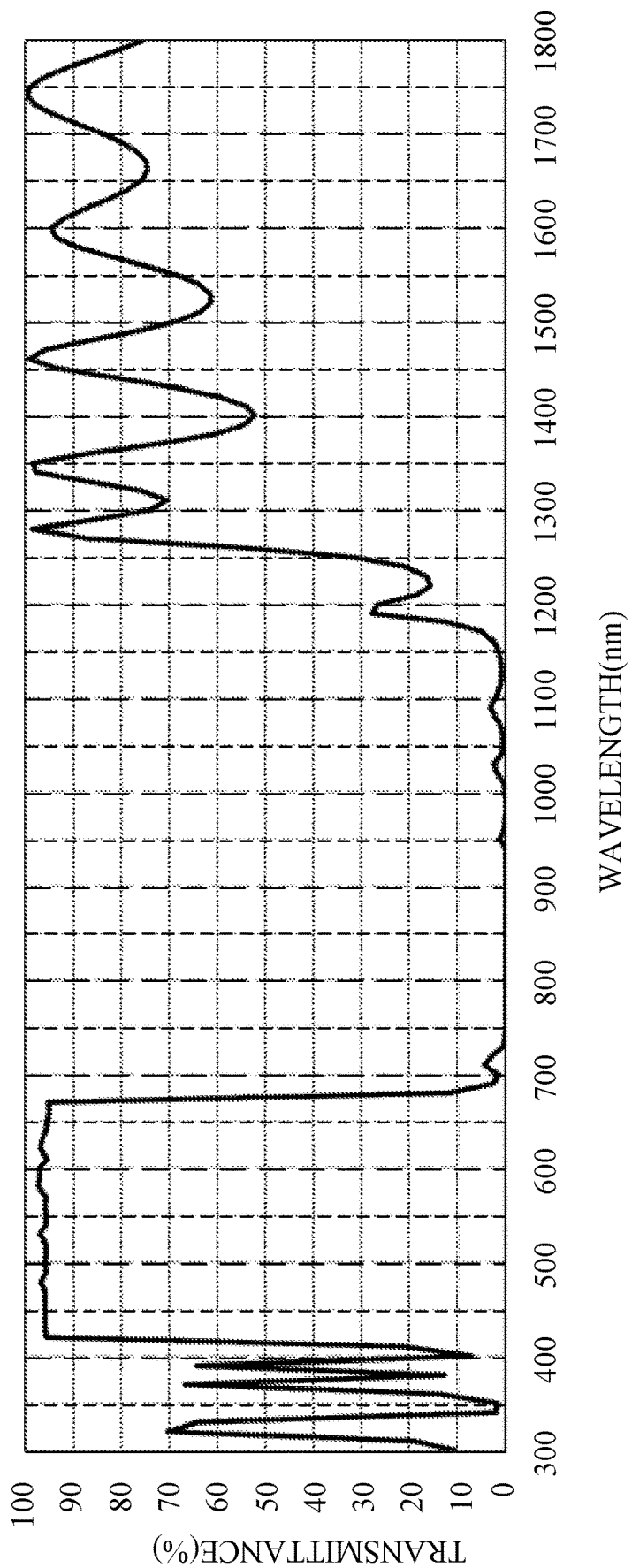
FIG. 7 illustrates a transmittance characteristic of a first IR cutting film (Examples 2 and 5).

The optical element 100 according to this example has the configuration illustrated in FIG. 1. The transparent substrate 10 is made of a glass material S1 having a refractive index (λ=550 nm) of 1.52 and no absorption. The optical multilayer film 1 is the first 1550 nm cutting film having a function of cutting 90% or higher of light having the wavelength of 1550 nm used for the LiDAR. The optical multilayer film 2 is a first IR cutting film that transmits light in a visible band having a wavelength of 420 nm to 680 nm and cuts light in an IR band having a wavelength of 700 nm to 1100 nm. Table 1 shows the first film structure of the 1550 nm cutting film, and Table 3 shows the film structure of the first IR cutting film. The refractive indexes in Tables 1 and 3 are values at the wavelength of 550 nm. The first IR cutting film includes a repetitive layer in which a film material M1 and a film material H2 are alternately repeated, and the final layer made of the film material L1. FIG. 7 illustrates the transmittance characteristic of the first IR cutting film.

Figure 8:
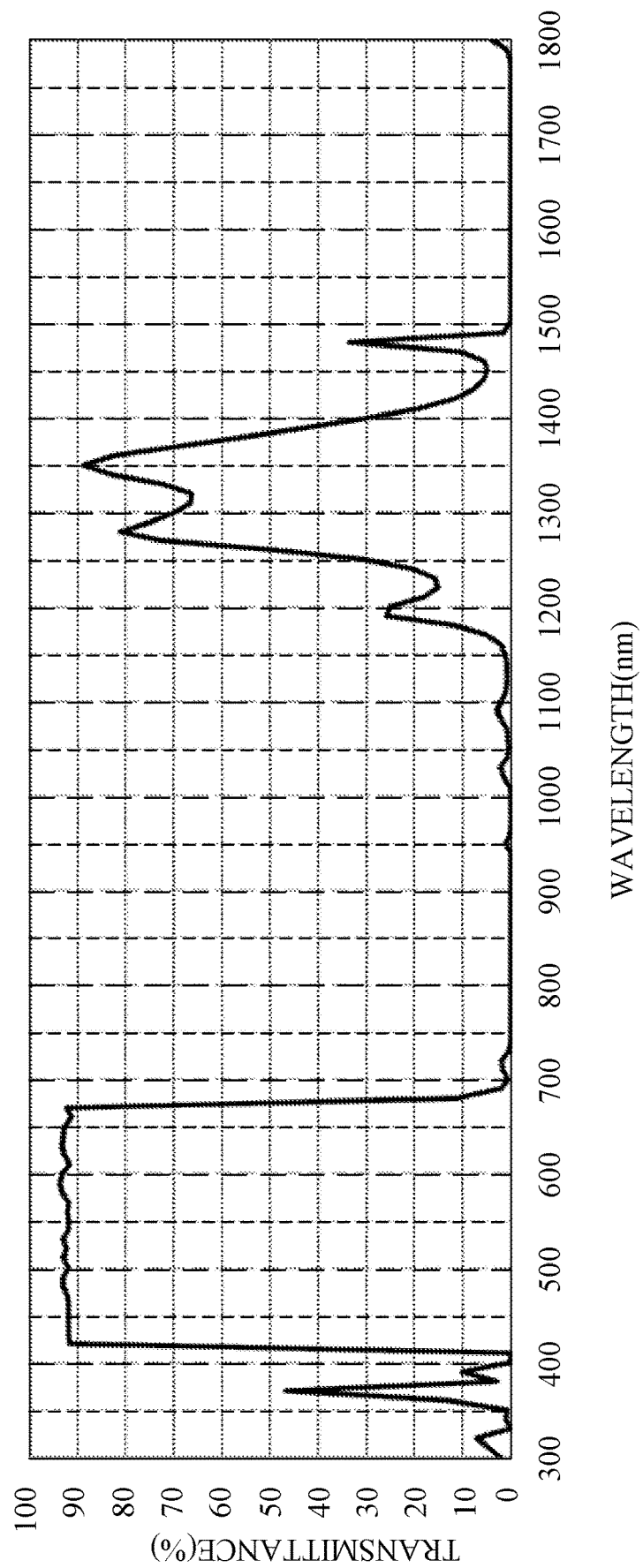
FIG. 8 illustrates a transmittance characteristic of the optical element according to Example 2.

The transmittance characteristic of the optical element 100 according to this example is a product of the transmittance characteristic of the first 1550 nm cutting film and the transmittance characteristic of the first IR cutting film. FIG. 8 illustrates the transmittance characteristic of the optical element 100 according to this example. The optical element 100 according to this example has an average transmittance of 80% or higher from a wavelength of 420 nm to 680 nm. The optical element 100 according to this example has a transmittance of 10% or lower at a wavelength of 1550 nm. That is, it can cut light having a wavelength of 1550 nm. It can also cut light in a wavelength band from 700 nm to 1100 nm.

TABLE 3

| Layer | Material | Refractive index | Optical film thickness (nm) |
|---|---|---|---|
| 41st | L1 | 1.38 | 88.4 |
| 40th | H2 | 2.3 | 215.2 |
| 39th | M1 | 1.46 | 198.3 |
| 38th | H2 | 2.3 | 208.7 |
| 37th | M1 | 1.46 | 193.9 |
| 36th | H2 | 2.3 | 207.4 |
| 35th | M1 | 1.46 | 208.3 |
| 34th | H2 | 2.3 | 213.3 |
| 33rd | M1 | 1.46 | 214.8 |
| 32nd | H2 | 2.3 | 215.8 |
| 31st | M1 | 1.46 | 220.4 |
| 30th | H2 | 2.3 | 215.2 |
| 29th | M1 | 1.46 | 202.1 |
| 28th | H2 | 2.3 | 198.1 |
| 27th | M1 | 1.46 | 205.2 |
| 26th | H2 | 2.3 | 189.0 |
| 25th | M1 | 1.46 | 210.8 |
| 24th | H2 | 2.3 | 176.4 |
| 23rd | M1 | 1.46 | 218.2 |
| 22nd | H2 | 2.3 | 177.5 |
| 21st | M1 | 1.46 | 230.5 |
| 20th | H2 | 2.3 | 127.4 |
| 19th | M1 | 1.46 | 233.2 |
| 18th | H2 | 2.3 | 179.4 |
| 17th | M1 | 1.46 | 207.7 |
| 16th | H2 | 2.3 | 207.4 |
| 15th | M1 | 1.46 | 252.7 |
| 14th | H2 | 2.3 | 298.1 |
| 13th | M1 | 1.46 | 263.7 |
| 12th | H2 | 2.3 | 234.0 |
| 11th | M1 | 1.46 | 250.0 |
| 10th | H2 | 2.3 | 291.2 |
| 9th | M1 | 1.46 | 261.1 |
| 8th | H2 | 2.3 | 221.1 |
| 7th | M1 | 1.46 | 242.3 |
| 6th | H2 | 2.3 | 281.4 |
| 5th | M1 | 1.49 | 300.3 |
| 4th | H2 | 2.3 | 108.2 |
| 3rd | M1 | 1.46 | 21.9 |
| 2nd | H2 | 2.3 | 106.4 |
| 1st | M1 | 1.46 | 199.0 |
| Substrate | S1 | 1.52 | |

Example 3

Figure 9:
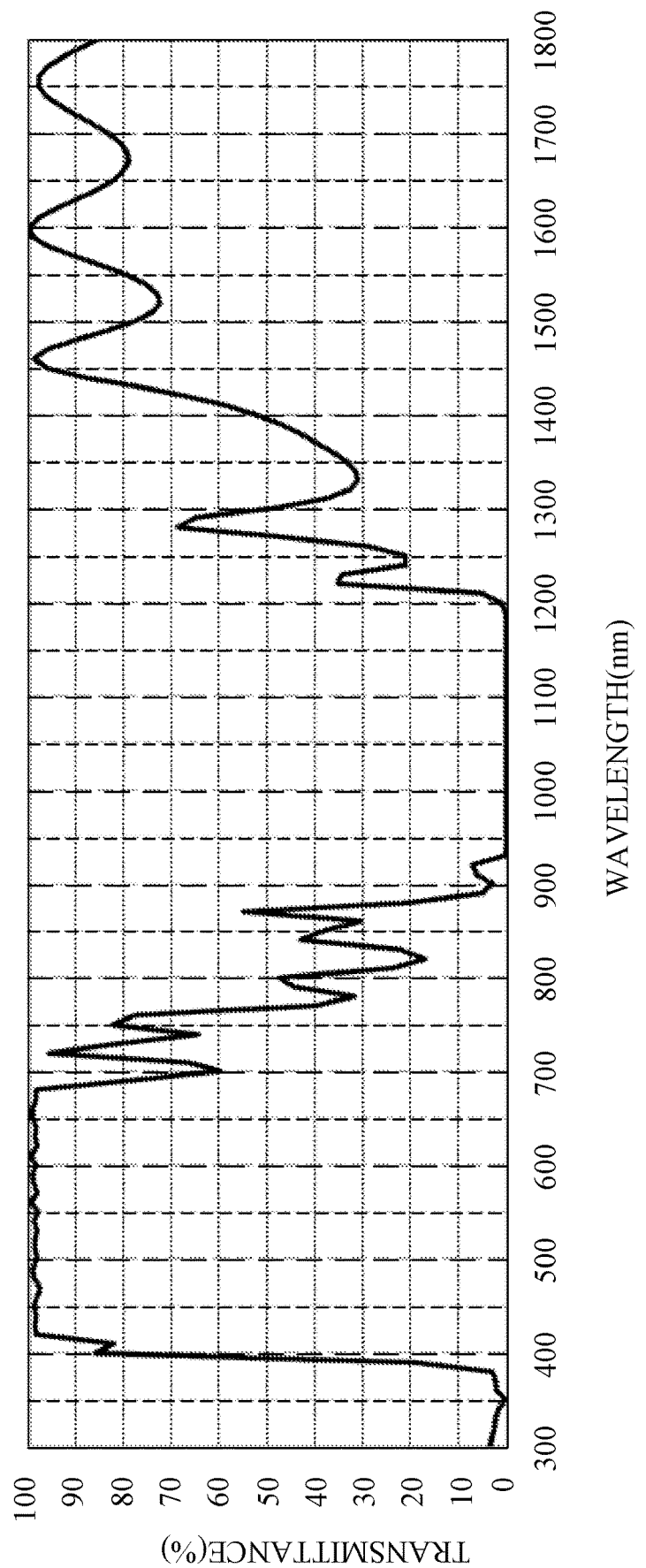
FIG. 9 illustrates a transmittance characteristic of a UV cutting film (Examples 3 and 5 to 7).

The optical element 100 according to this example has a configuration illustrated in FIG. 1. The transparent substrate 10 is a glass material S1 having a refractive index (λ=550 $n_m$) of 1.52 and no absorption. The optical multilayer film 1 is the first 1550 nm cutting film having a function of cutting 90% or higher of the light having the wavelength of 1550 nm used for the LiDAR. The optical multilayer film 2 is a UV cutting film that transmits light in a visible band having a wavelength from 420 nm to 680 nm and cuts light in a UV band having a wavelength from 300 nm to 400 nm. Table 1 shows the film structure of the first 1550 nm cutting film 1, and Table 4 shows the film structure of the UV cutting film. The refractive indexes in Tables 1 and 4 are values at the wavelength of 550 nm. The UV cutting film includes a repetitive layer in which the film material M1 and the film material H2 are alternately repeated, and the final layer made of the film material L1. FIG. 9 illustrates the transmittance characteristic of the UV cutting film.

Figure 10:
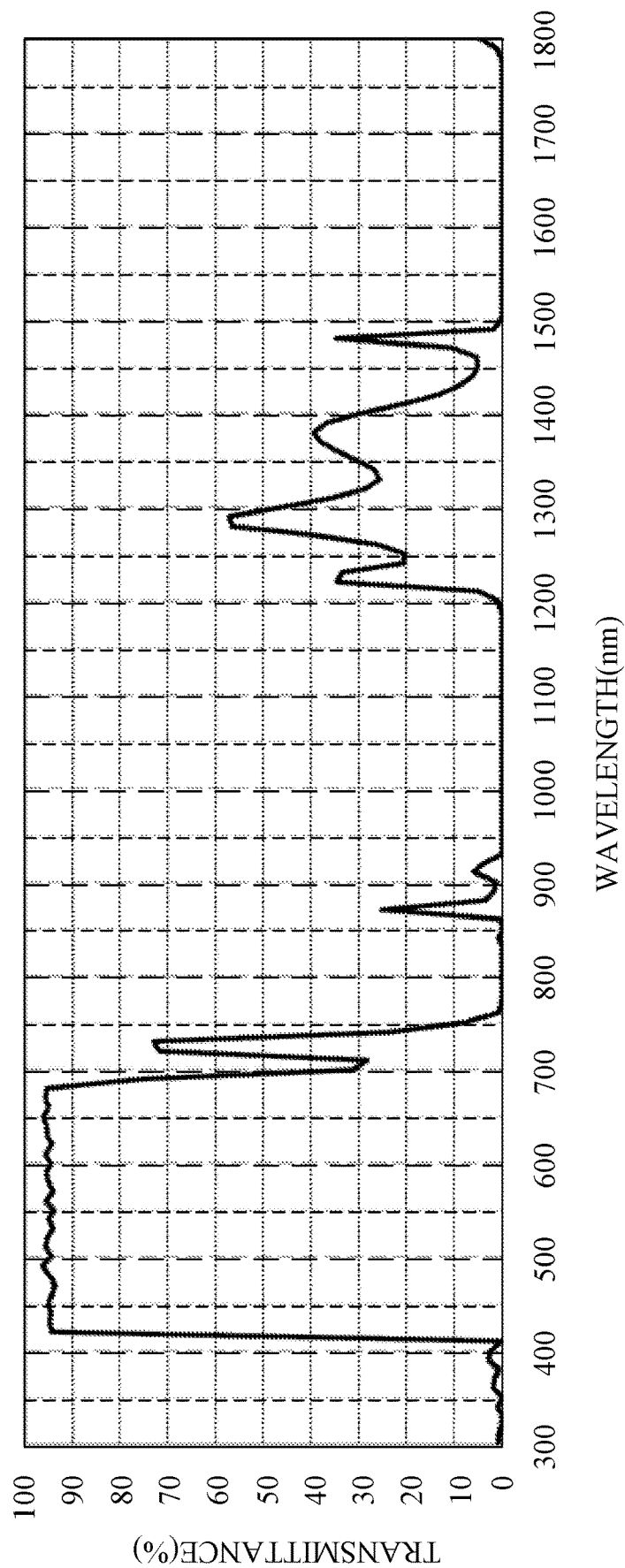
FIG. 10 illustrates a transmittance characteristic of the optical element according to Example 3.

The transmittance characteristic of the optical element 100 according to this embodiment is a product of the transmittance characteristic of the first 1550 nm cutting film and the transmittance characteristic of the UV cutting film. FIG. 10 illustrates the transmittance characteristic of the optical element 100 according to this example. The optical element 100 according to this example has an average transmittance of 80% or higher at a wavelength of 420 nm to 680 nm. It has a transmittance of 10% or lower at the wavelength of 1550 nm. That is, it can cut the light having the wavelength of 1550 nm. Further, it can cut the light having a wavelength band of 300 nm to 400 nm.

TABLE 4

| Layer | Material | Refractive index | Optical film thickness (nm) |
|---|---|---|---|
| 31st | L1 | 1.38 | 132.1 |
| 30th | H2 | 2.3 | 243.8 |
| 29th | M1 | 1.46 | 230.1 |
| 28th | H2 | 2.3 | 251.1 |
| 27th | M1 | 1.46 | 269.0 |
| 28th | H2 | 2.3 | 276.8 |
| 25th | M1 | 1.46 | 254.7 |
| 24th | H2 | 2.3 | 234.9 |
| 23rd | M1 | 1.46 | 246.7 |
| 22nd | H2 | 2.5 | 268.9 |
| 21st | M1 | 1.46 | 272.1 |
| 20th | H2 | 2.3 | 273.0 |
| 19th | M1 | 1.46 | 274.7 |
| 18th | H2 | 2.3 | 279.0 |
| 17th | M1 | 1.46 | 278.1 |
| 16th | H2 | 2.3 | 280.0 |
| 15th | M1 | 1.46 | 275.1 |
| 14th | H2 | 2.3 | 249.8 |
| 13th | M1 | 1.46 | 228.1 |

TABLE 4-continued

| Layer | Material | Refractive index | Optical film thickness (nm) |
|---|---|---|---|
| 12th | H2 | 2.3 | 227.0 |
| 11th | M1 | 1.46 | 234.4 |
| 10th | H2 | 2.3 | 253.6 |
| 9th | M1 | 1.46 | 272.4 |
| 8th | H2 | 2.3 | 278.0 |
| 7th | M1 | 1.46 | 279.6 |
| 6th | H2 | 2.3 | 273.0 |
| 5th | M1 | 1.46 | 256.6 |
| 4th | H2 | 2.3 | 229.3 |
| 3rd | M1 | 1.46 | 227.2 |
| 2nd | H2 | 2.3 | 247.3 |
| 1st | M1 | 1.46 | 243.9 |
| Substrate | S1 | 1.52 | |

Example 4

Figure 11:
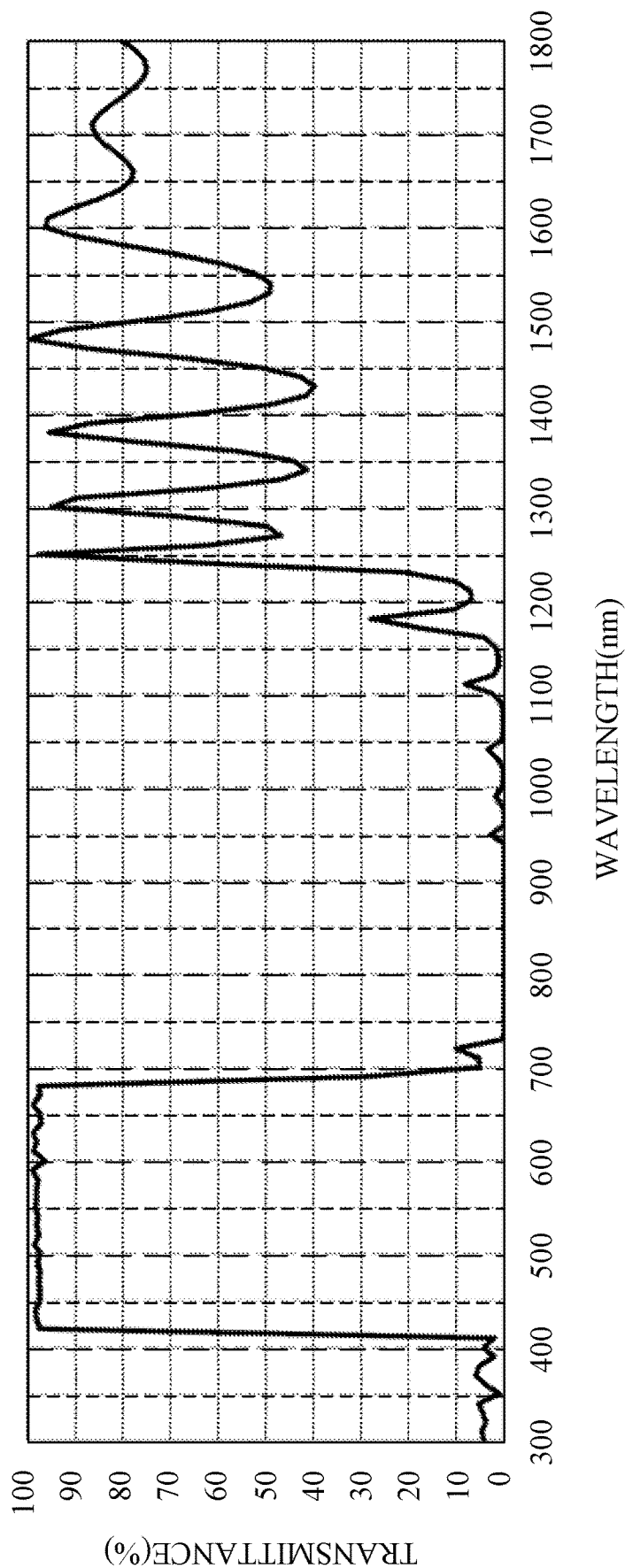
FIG. 11 illustrates a transmittance characteristic of a UV-IR cutting film (Example 4).

The optical element 100 according to this example has the configuration illustrated in FIG. 1. The transparent substrate 10 is made of a glass material S1 having a refractive index (λ=550 nm) of 1.52 and no absorption. The optical multi-layer film 1 is a first 1550 nm cutting film 1 having a function of cutting 90% or higher of light having the wavelength of 1550 nm used for the LiDAR. The optical multilayer film 2 is a UV-IR cutting film that transmits light in the wavelength range of 420 nm to 680 nm, which is a visible range, and cuts light in the wavelength range of 300 nm to 400 nm, which is a UV band, and cuts light having a wavelength of 700 nm to 1100 nm, which is an IR band. Table 1 shows the film structure of the first 1550 nm cutting film, and Table 5 shows the film structure of the UV-IR cutting film. The refractive indexes in Tables 1 and 5 are values at a wavelength of 550 nm. The UV-IR cutting film 2 includes a repetitive layer in which the film material M1 and the film material H2 are alternately repeated, and the final layer made of the film material L1. FIG. 11 illustrates the transmittance characteristic of the UV-IR cutting film.

The transmittance characteristic of the optical element 100 according to this example is a product of the transmittance characteristic of the first 1550 nm cutting film and the transmittance characteristic of the UV-IR cutting film. FIG. 2 illustrates the transmittance characteristic of the optical element 100 according to this example. The optical element 100 according to this example has an average transmittance of 80% or higher at the wavelength of 420 nm to 680 nm. It has a transmittance of 10% or lower at the wavelength of 1550 nm. That is, it can cut the light having the wavelength of 1550 nm. Further, it can cut the light in the wavelength band of 300 nm to 400 nm and light in the wavelength band of 700 nm to 1100 nm.

TABLE 5

| Layer | Material | Refractive index | Optical film thickness (nm) |
|---|---|---|---|
| 51st | L1 | 1.38 | 142.1 |
| 50th | H2 | 2.3 | 276.1 |
| 49th | M1 | 1.46 | 250.8 |
| 48th | H2 | 2.3 | 215.4 |
| 47th | M1 | 1.46 | 209.5 |
| 46th | H2 | 2.3 | 214.5 |
| 45th | M1 | 1.46 | 190.6 |
| 44th | H2 | 2.3 | 213.9 |
| 43rd | M1 | 1.46 | 195.9 |
| 42nd | H2 | 2.3 | 207.3 |
| 41st | M1 | 1.46 | 193.4 |
| 40th | H2 | 2.3 | 204.2 |
| 39th | M1 | 1.46 | 211.0 |
| 38th | H2 | 2.3 | 206.4 |
| 37th | M1 | 1.46 | 207.2 |
| 36th | H2 | 2.3 | 205.9 |
| 35th | M1 | 1.46 | 223.0 |
| 34th | H2 | 2.3 | 213.2 |
| 33rd | M1 | 1.46 | 223.7 |
| 32nd | H2 | 2.3 | 192.0 |
| 31st | M1 | 1.46 | 227.2 |
| 30th | H2 | 2.3 | 169.7 |
| 29th | M1 | 1.46 | 223.8 |
| 28th | H2 | 2.3 | 184.7 |
| 27th | M1 | 1.46 | 231.9 |
| 26th | H2 | 2.3 | 159.7 |
| 25th | M1 | 1.46 | 238.2 |
| 24th | H2 | 2.3 | 153.6 |
| 23rd | M1 | 1.46 | 242.7 |
| 22nd | H2 | 2.3 | 157.2 |
| 21st | M1 | 1.46 | 257.5 |
| 20th | H2 | 2.3 | 99.7 |
| 19th | M1 | 1.46 | 255.3 |
| 18th | H2 | 2.3 | 177.3 |
| 17th | M1 | 1.46 | 232.2 |
| 16th | M2 | 2.3 | 207.8 |
| 15th | M1 | 1.46 | 246.6 |
| 14th | H2 | 2.3 | 281.5 |
| 13th | M1 | 1.46 | 266.9 |
| 12th | H2 | 2.3 | 249.7 |
| 11th | M1 | 1.46 | 244.3 |
| 10th | H2 | 2.3 | 252.7 |
| 9th | M1 | 1.46 | 248.4 |
| 8th | H2 | 2.3 | 241.0 |
| 7th | M1 | 1.46 | 264.9 |
| 6th | H2 | 2.3 | 288.3 |
| 5th | M1 | 1.46 | 314.9 |
| 4th | H2 | 2.3 | 90.2 |
| 3rd | M1 | 1.46 | 61.2 |
| 2nd | H2 | 2.3 | 66.6 |
| 1st | M1 | 1.46 | 91.0 |
| Substrate | S1 | 1.52 | |

Example 5

The optical element 200 according to this example has the configuration of FIG. 3A. Each of the transparent substrates 12 and 13 is made of the glass material S1 having a refractive index (λ=550 nm) of 1.52 and no absorption. The optical multilayer film 3 is the first 1550 nm cutting film having a function of cutting 90% or higher of the light having the wavelength of 1550 nm used for the LiDAR. The optical multilayer film 4 is the visible-range antireflection film that transmits the light having a visible-range wavelength from 420 nm to 680 nm. The optical multilayer film 5 is a first IR cutting film that transmits light having a visible-range wavelength from 420 nm to 680 nm and cuts light in an IR-band wavelength from 700 nm to 1100 nm. The optical multilayer film 6 is a UV cutting film that transmits light having a visible-range wavelength from 420 nm to 680 nm and cuts light having a UV-band wavelength from 300 nm to 400 nm.

Figure 12:
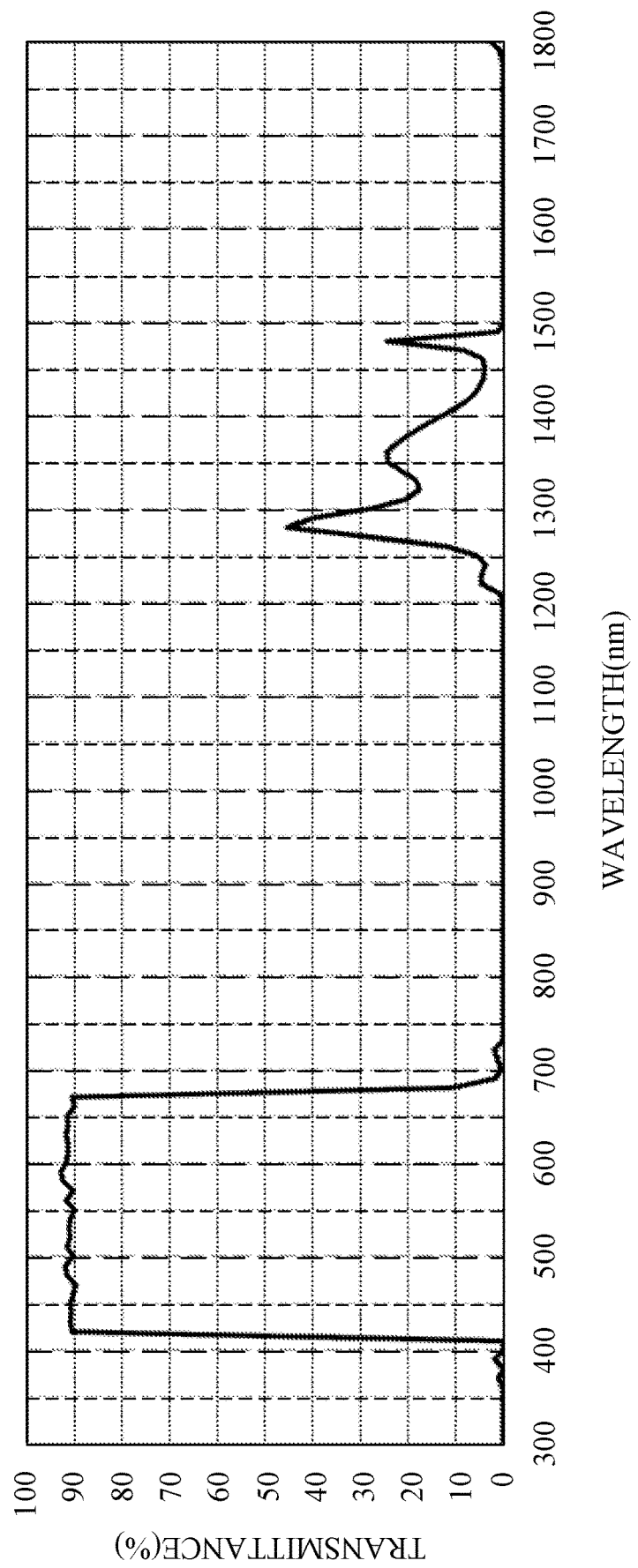
FIG. 12 illustrates a transmittance characteristic of the optical element according to Example 5.

The transmittance characteristic of the optical element 200 according to this example is a product of the transmittance characteristics of the four films. FIG. 12 illustrates the transmittance characteristic of the optical element 200 according to this example. The optical element 200 according to this example has an average transmittance of 80% or higher at the wavelength range from 420 nm to 680 nm. Further, it has a transmittance of 10% or lower at the wavelength of 1550 nm. That is, it can cut the light having the wavelength of 1550 nm. Further, it can cut the light having a wavelength band of 300 nm to 400 nm and the light having the wavelength band of 700 nm to 1100 nm.

As long as all of the first 1550 nm cutting film, the visible-range antireflection film, the first IR cutting film, and the UV cutting film are used, the transmittance characteristic illustrated in FIG. 12 is available and thus the film array is not limited to the order of this example and may have any orders.

Example 6

Figure 13:
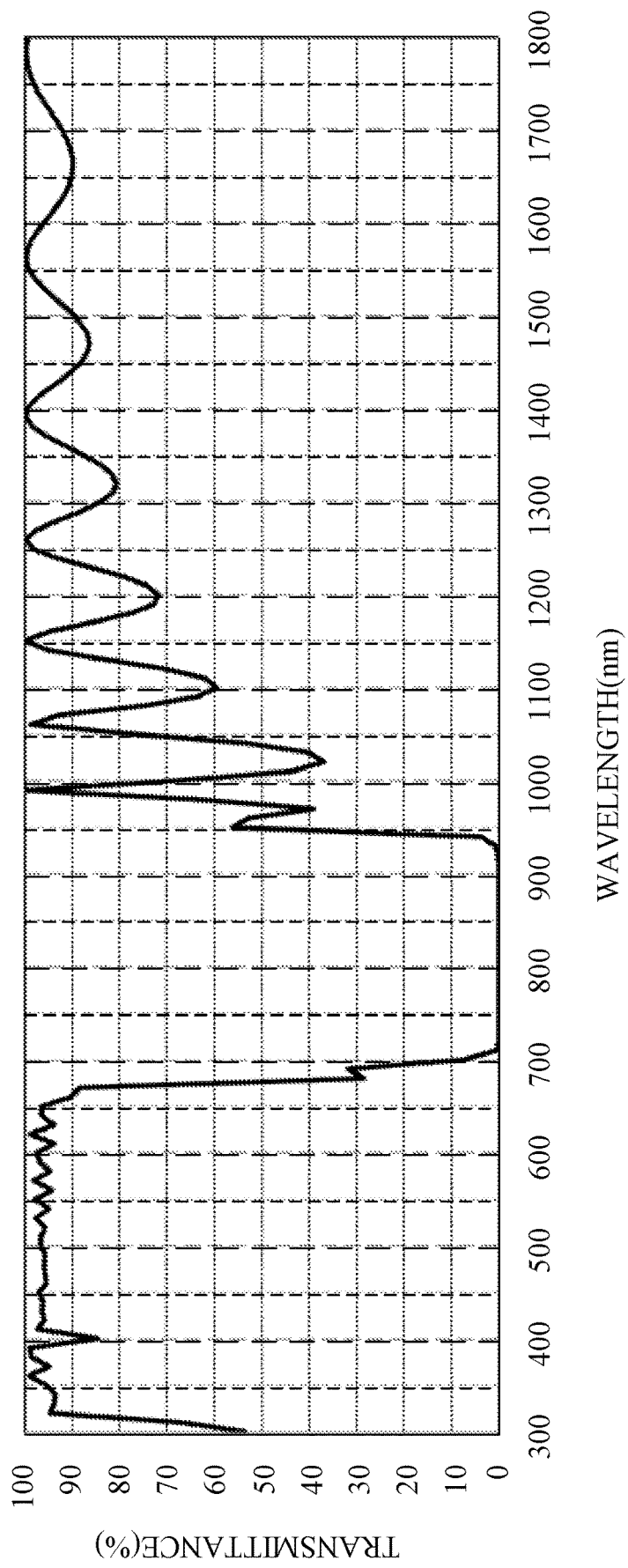
FIG. 13 illustrates a transmittance characteristic of a second IR cutting film (Example 6).
Figure 14:
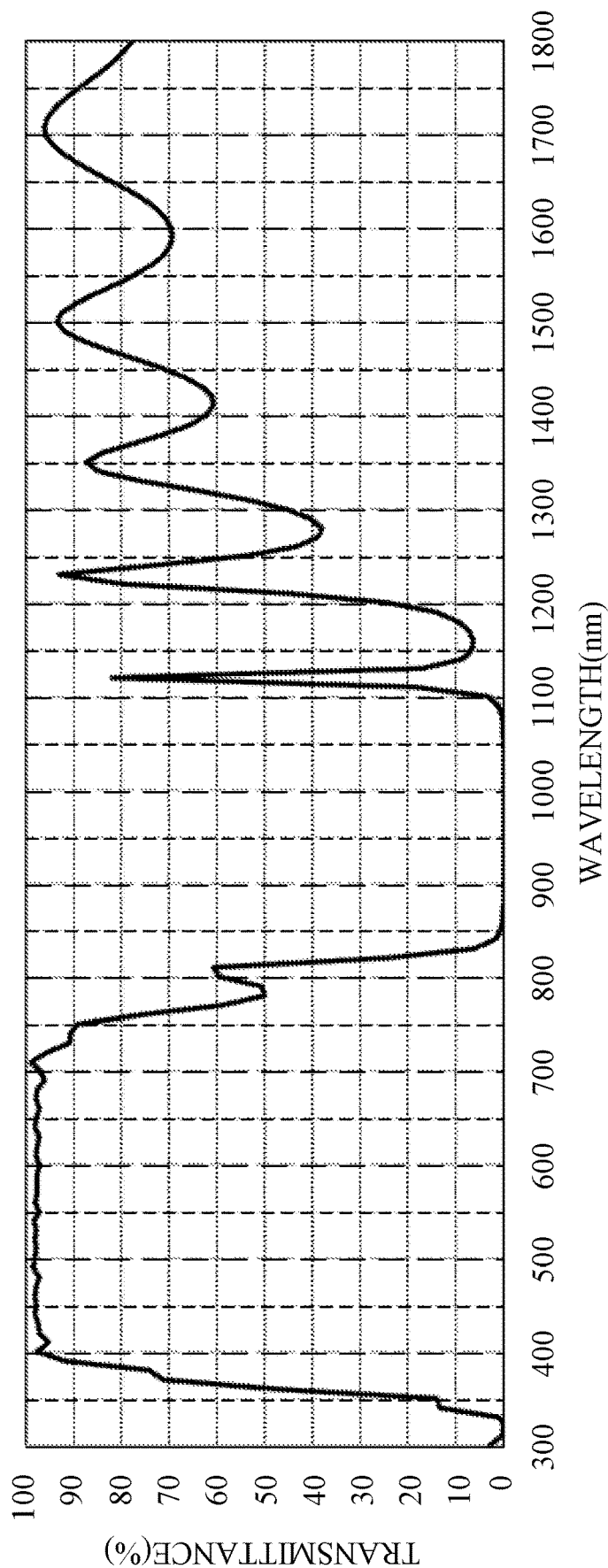
FIG. 14 illustrates a transmittance characteristic of a third IR cutting film (Example 6).

The optical element 200 according to this example has the configuration of FIG. 3A. Each of the transparent substrates 12 and 13 is made of the glass material S1 having a refractive index (λ=550 nm) of 1.52 and no absorption. The optical multilayer film 3 is the first 1550 nm cutting film 1 having a function of cutting 90% or higher of the light having the wavelength of 1550 nm used for the LiDAR. The optical multilayer film 4 is a second IR cutting film that cuts the light having an IR-band wavelength from 700 nm to 900 nm. The optical multilayer film 5 is a third IR cutting film that cuts the light having an IR-band wavelength of 900 nm to 1100 nm. The optical multilayer film 6 is a UV cutting film that cuts the light having an UV-band wavelength from 300 nm to 400 nm. Tables 1, 4, 6, and 7 show the film structures of the first 1550 nm cutting film, the UV cutting film, and the second IR cutting film, and the third IR cutting film, respectively. The refractive indexes in Tables 1, 4, 6, and 7 are values at the wavelength of 550 nm. FIGS. 13 and 14 show the transmittance characteristics of the second and third IR cutting films, respectively.

Figure 15:
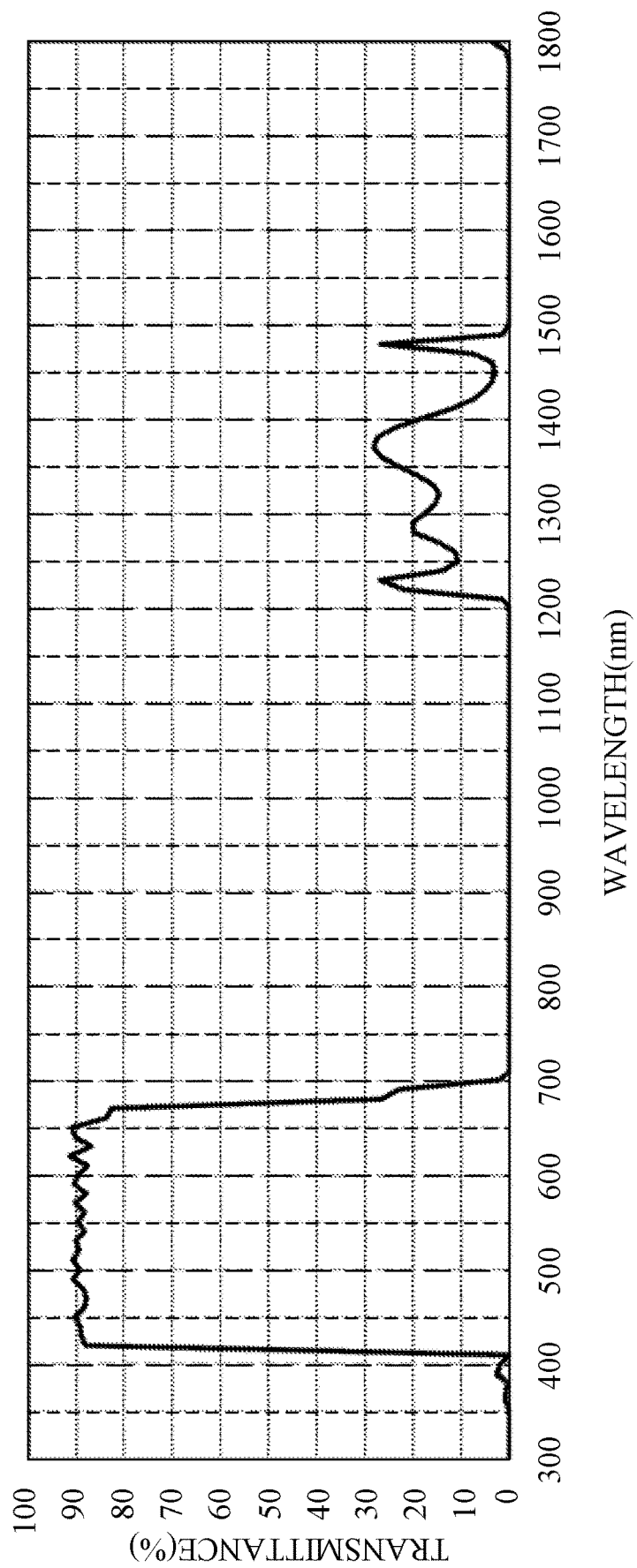
FIG. 15 illustrates a transmittance characteristic of the optical element according to Example 6.

The transmittance characteristic of the optical element 200 according to this example has a product of a transmittance characteristic of the first 1550 nm cutting film, the transmittance characteristic of the second IR cutting film, the transmittance characteristic of the third IR cutting film, and the transmittance characteristic of the UV cutting film. FIG. 15 illustrates the transmittance characteristic of the optical element 200 according to this example. The optical element 200 according to this example has an average transmittance of 80% or higher at the wavelength from 420 nm to 680 nm. Further, it has a transmittance of 10% or lower at a wavelength of 1550 nm. That is, it can cut light having a wavelength of 1550 nm. It can cut the light having a wavelength of 300 nm to 400 nm and the light having the wavelength of 700 nm to 1100 nm.

As long as all of the first 1550 nm cutting film, the second and third IR cutting films, and the UV cutting film are used, the transmittance characteristic illustrated in FIG. 15 can be obtained and the film arrangement is not limited to the order according to this example and may have any orders.

TABLE 6

| Layer | Material | Refractive index | Optical film thickness (nm) |
|---|---|---|---|
| 25th | L1 | 1.38 | 181.1 |
| 24th | H2 | 2.3 | 218.7 |
| 23rd | M1 | 1.46 | 194.2 |
| 22nd | H2 | 2.3 | 233.1 |
| 21st | M1 | 1.46 | 169.6 |
| 20th | H2 | 2.3 | 220.6 |
| 19th | M1 | 1.46 | 168.4 |
| 18th | H2 | 2.3 | 227.9 |
| 17th | M1 | 1.46 | 152.0 |

TABLE 6-continued

| Layer | Material | Refractive index | Optical film thickness (nm) |
|---|---|---|---|
| 16th | H2 | 2.3 | 218.2 |
| 15th | M1 | 1.46 | 179.3 |
| 14th | S2 | 2.3 | 202.2 |
| 13th | M1 | 1.46 | 185.3 |
| 12th | H2 | 2.3 | 196.1 |
| 11th | M1 | 1.46 | 197.1 |
| 10th | H2 | 2.3 | 188.5 |
| 9th | M1 | 1.46 | 194.9 |
| 8th | H2 | 2.3 | 199.0 |
| 7th | M1 | 1.46 | 186.1 |
| 6th | H2 | 2.3 | 205.2 |
| 5th | M1 | 1.46 | 177.3 |
| 4th | H2 | 2.3 | 223.5 |
| 3rd | M1 | 1.46 | 149.9 |
| 2nd | H2 | 2.3 | 229.8 |
| 1st | M1 | 1.46 | 166.0 |
| Substrate | S1 | 1.53 | |

TABLE 7

| Layer | Material | Refractive index | Optical film thickness (nm) |
|---|---|---|---|
| 25th | L1 | 1.38 | 131.5 |
| 24th | H2 | 2.3 | 260.4 |
| 23rd | M1 | 1.46 | 260.8 |
| 22nd | H2 | 2.3 | 254.0 |
| 21st | M1 | 1.46 | 247.6 |
| 20th | H2 | 2.3 | 240.4 |
| 19th | M1 | 1.46 | 236.3 |
| 18th | H2 | 2.3 | 232.4 |
| 17th | M1 | 1.46 | 232.4 |
| 16th | H2 | 2.3 | 230.0 |
| 15th | M1 | 1.46 | 228.1 |
| 14th | H2 | 2.3 | 228.0 |
| 13th | M1 | 1.46 | 225.2 |
| 12th | H2 | 2.3 | 227.3 |
| 11th | M1 | 1.46 | 227.1 |
| 10th | H2 | 2.3 | 231.7 |
| 9th | M1 | 1.46 | 235.5 |
| 8th | H2 | 2.3 | 243.1 |
| 7th | M1 | 1.46 | 249.1 |
| 6th | H2 | 2.3 | 251.4 |
| 5th | M1 | 1.46 | 245.8 |
| 4th | H2 | 2.3 | 241.7 |
| 3rd | M1 | 1.46 | 246.1 |
| 2nd | H2 | 2.3 | 250.7 |
| 1st | M1 | 1.46 | 128.8 |
| Substrate | S1 | 1.52 | |

Example 7

Figure 16:
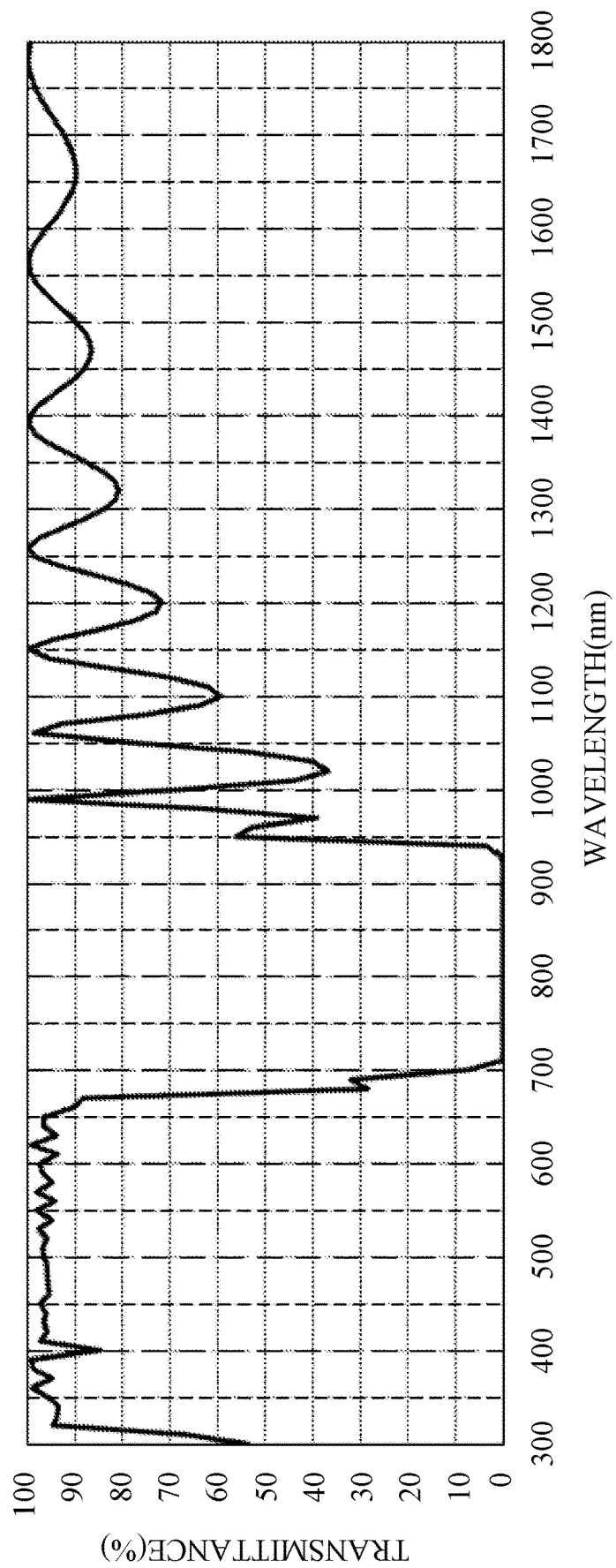
FIG. 16 illustrates a transmittance characteristic of a fourth IR cutting film (Example 7).

The optical element 300 according to this example has the configuration of FIG. 3B. The transparent substrates 14 and 16 are made of the glass material S1 having a refractive index (λ=550 nm) of 1.52 and no absorption. The adhesive 15 is an adhesive A1 having a refractive index (λ=550 nm) of 1.52 and no absorption. The optical multilayer film 7 is the first 1550 nm cutting film having a function of cutting 90% or higher of the light having the wavelength of 1550 nm used for the LiDAR. The optical multilayer film 8 is a fourth IR cutting film that cuts the light in a wavelength band from 700 nm to 1100 nm, which is an IR band. The optical multilayer film 9 is a UV cutting film that cuts the light in a wavelength band of 300 nm to 400 nm, which is a UV band. The film structures of the first 1550 nm cutting film, the UV cutting film, and the fourth IR cutting film are shown in Tables 1, 4, and 8, respectively. The refractive indexes in Tables 1, 4, and 8 are values at the wavelength of 550 nm. FIG. 16 illustrates the transmittance characteristic of the fourth IR cutting film.

Figure 17:
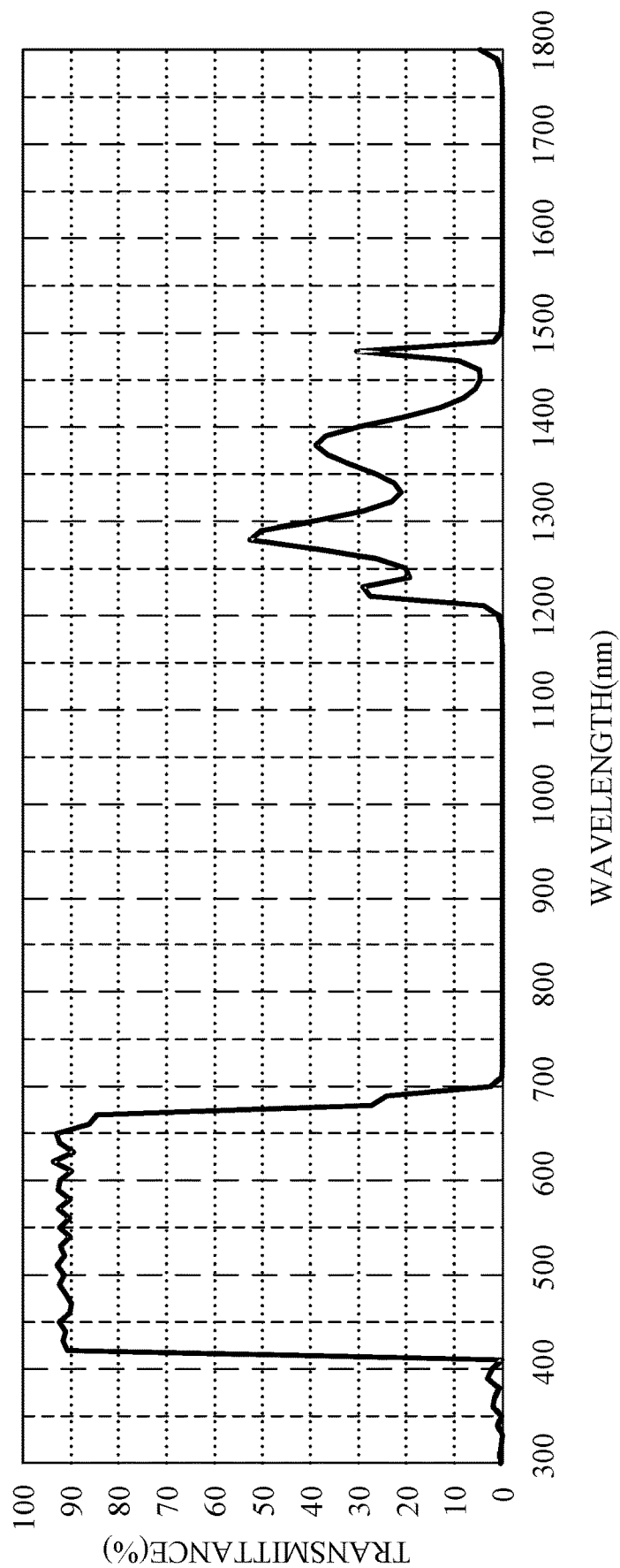
FIG. 17 illustrates a transmittance characteristic of an optical element according to Example 7.

The transmittance characteristic of the optical element 300 of this example is a product of the transmittance characteristic of the first 1550 nm cutting film, the transmittance characteristic of the fourth IR cutting film, and the transmittance characteristic of the UV cutting film. FIG. 17 illustrates the transmittance characteristic of the optical element 300 according to this example. The optical element 300 according to this example has an average transmittance of 80% or higher at the wavelength from 420 nm to 680 nm. It has a transmittance of 10% or lower at the wavelength of 1550 nm. It can cut the light having the wavelength of 1550 nm. It can cut the light in a wavelength band of 300 nm to 400 nm and light in a wavelength band of 700 nm to 1100 nm.

TABLE 8

| Layer | Material | Refractive index | Optical film thickness (nm) |
|---|---|---|---|
|  | A1 | 1.52 |  |
| 31st | M1 | 1.46 | 194.6 |
| 30th | H2 | 2.3 | 202.7 |
| 29th | M1 | 1.46 | 214.9 |
| 28th | H2 | 2.3 | 202.3 |
| 27th | M1 | 1.46 | 199.8 |
| 26th | H2 | 2.3 | 198.4 |
| 25th | M1 | 1.46 | 193.9 |
| 24th | H2 | 2.3 | 199.9 |
| 23rd | M1 | 1.4$ | 196.5 |
| 22nd | H2 | 2.3 | 199.1 |
| 21st | M1 | 1.46 | 197.3 |
| 20th | H2 | 2.3 | 202.8 |
| 19th | M1 | 1.46 | 199.2 |
| 18th | H2 | 2.3 | 207.0 |
| 17th | M1 | 1.46 | 198.1 |
| 16th | H2 | 2.3 | 211.8 |
| 15th | M1 | 1.46 | 194.0 |
| 14th | H2 | 2.3 | 211.4 |
| 13th | M1 | 1.46 | 195.5 |
| 12th | H2 | 2.3 | 205.1 |
| 11th | M1 | 1.46 | 198.9 |
| 10th | H2 | 2.3 | 199.2 |
| 9th | M1 | 1.46 | 199.6 |
| 8th | H2 | 2.3 | 198.6 |
| 7th | M1 | 1.46 | 194.1 |
| 6th | H2 | 2.3 | 203.5 |
| 5th | M1 | 1.46 | 197.4 |
| 4th | H2 | 2.3 | 197.4 |
| 3rd | M1 | 1.46 | 206.6 |
| 2nd | H2 | 2.3 | 228.0 |
| 1st | M1 | 1.46 | 218.7 |
| Substrate | S1 | 1.52 |  |

Example 8

Figure 18:
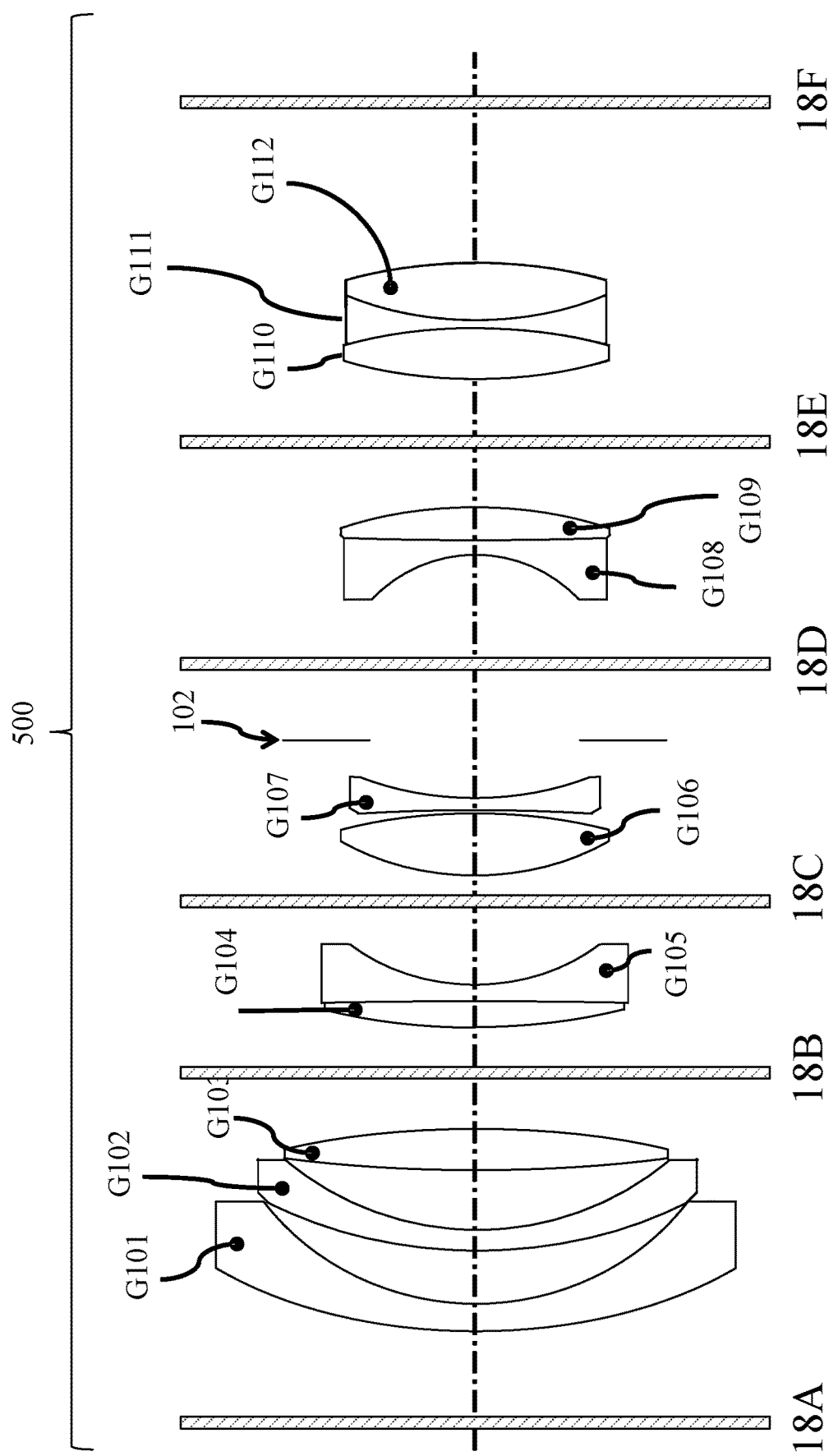
FIG. 18 is a schematic sectional view of an optical system according to Example 8.

This example will discuss an optical system according to another embodiment of the present invention. FIG. 18 is a schematic sectional view of an optical system 500. The optical system 500 has a plurality of optical elements G101 to G112 and a diaphragm (aperture stop) 102. 18A to 18F denote positions where the optical element according to the present invention can be disposed. The optical element according to the present invention may be disposed at any of the positions denoted by 18A to 18F.

Example 9

Figure 19:
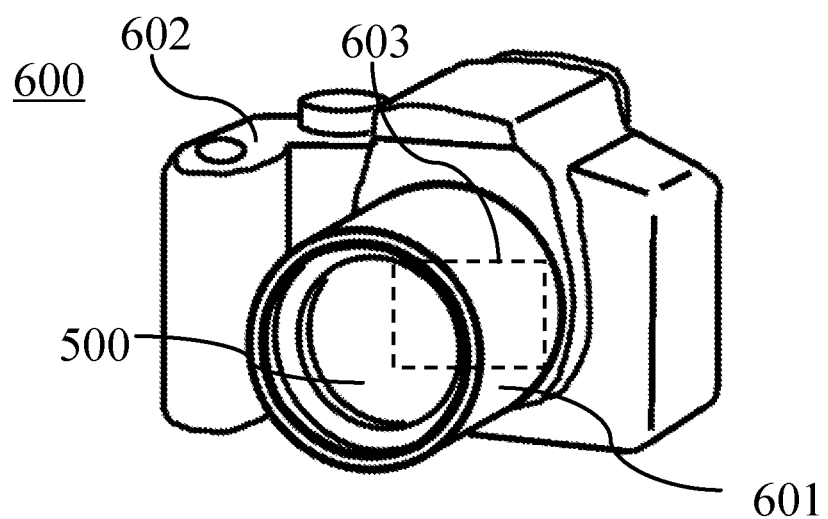
FIG. 19 is a perspective view of a digital camera which is an illustrative image pickup apparatus according to Example 9.

This example will discuss an image pickup apparatus according to another embodiment of the present invention. FIG. 19 is a perspective view of a digital camera 600 that is an example of an image pickup apparatus. The digital camera 600 has a lens unit 601 and a body 602. The lens unit 601 includes the optical system 500 according to Example 8. The body 602 has an image sensor 603 such as a CCD and a CMOS sensor, which is located at the image plane of the optical system 500. The image sensor 603 photoelectrically converts an optical image formed via the optical system 500 and outputs image data. The optical element according to the present invention may be incorporated in the lens unit 601 or may be attached to the front surface of the lens unit 601 as a filter. It may be disposed on the front surface of the image sensor 603 in the body 602.

The optical element according to the present invention is effective also in an image pickup apparatus using a small lens used for driving assistances or the like, but is more effective in a photographing image pickup apparatus using a larger lens. In particular, it is effective when used in an image pickup apparatus having an effective diameter of 10 mm or larger.

Example 10

This example will describe second to fourth 1550 nm cutting films different from the first 1550 nm cutting film used in Examples 1 to 7.

Figure 20:
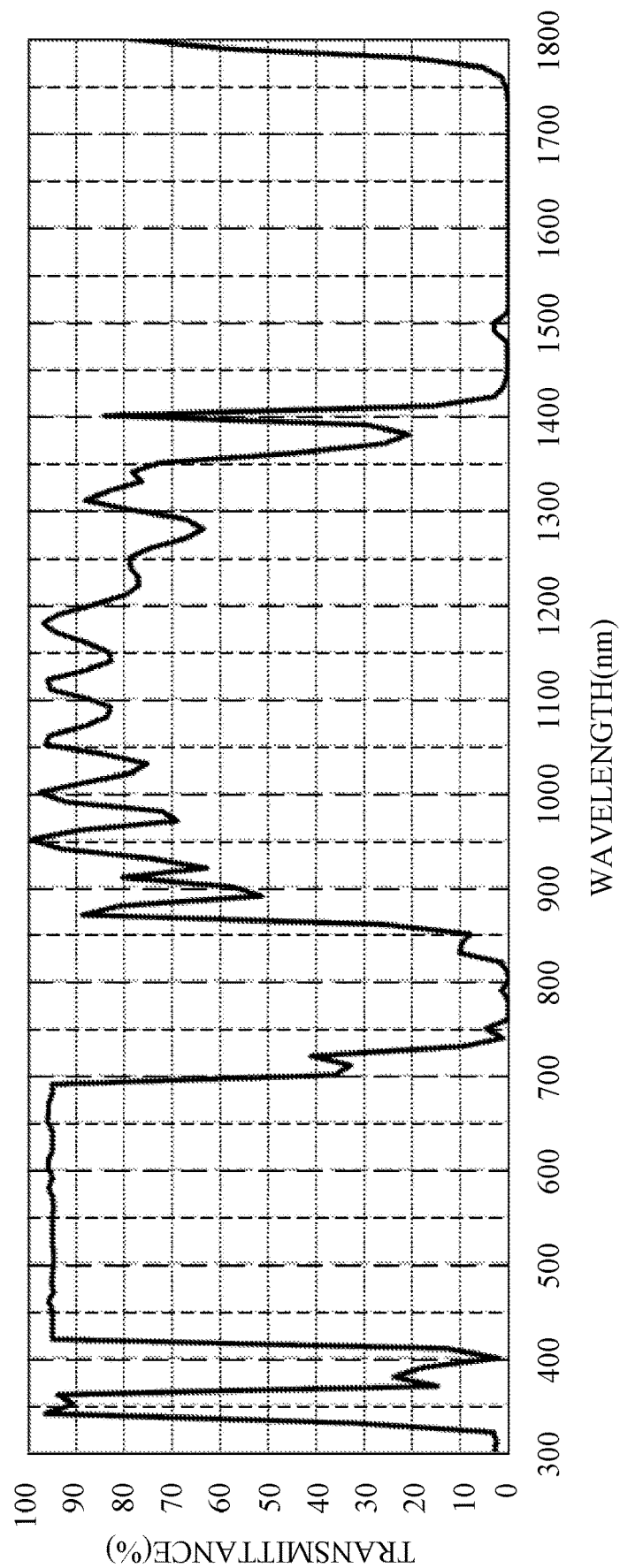
FIG. 20 illustrates a transmittance characteristic of a second 1550 nm cutting film (Example 10).
Figure 21:
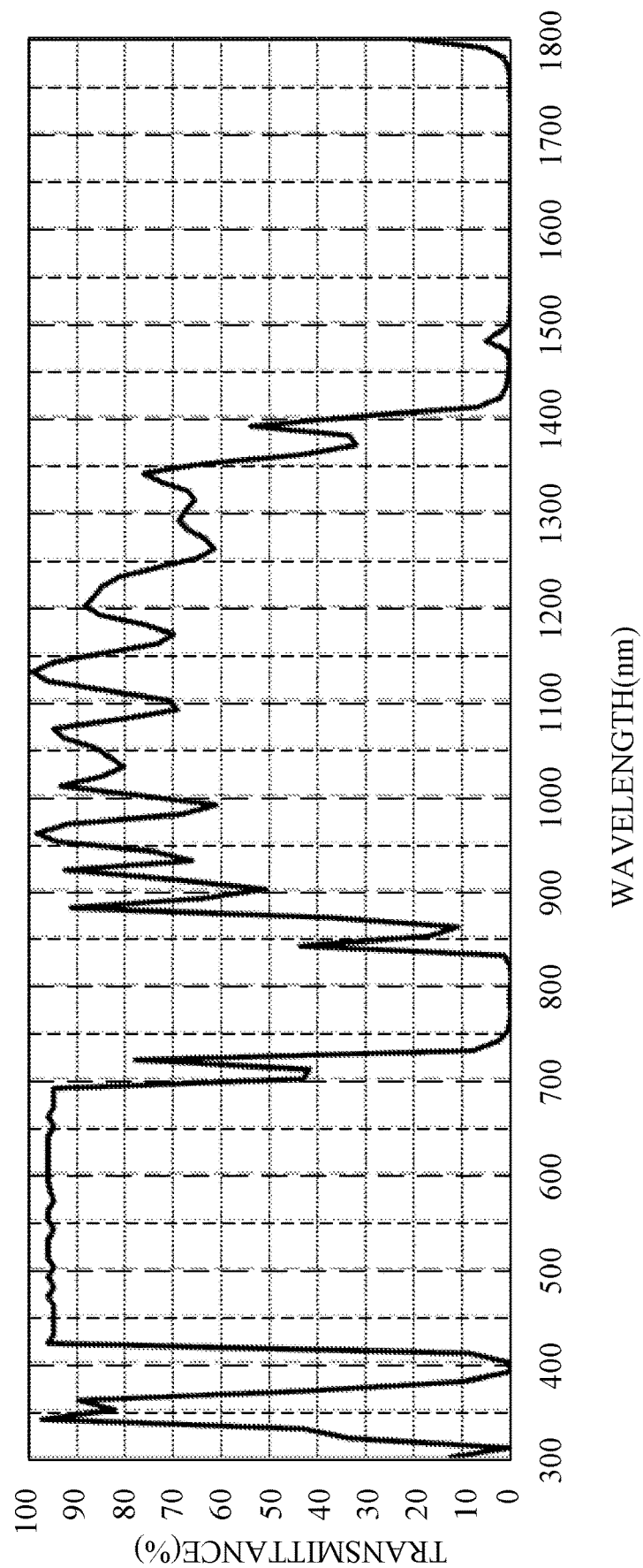
FIG. 21 illustrates a transmittance characteristic of a third 1550 nm cutting film (Example 10).
Figure 22:
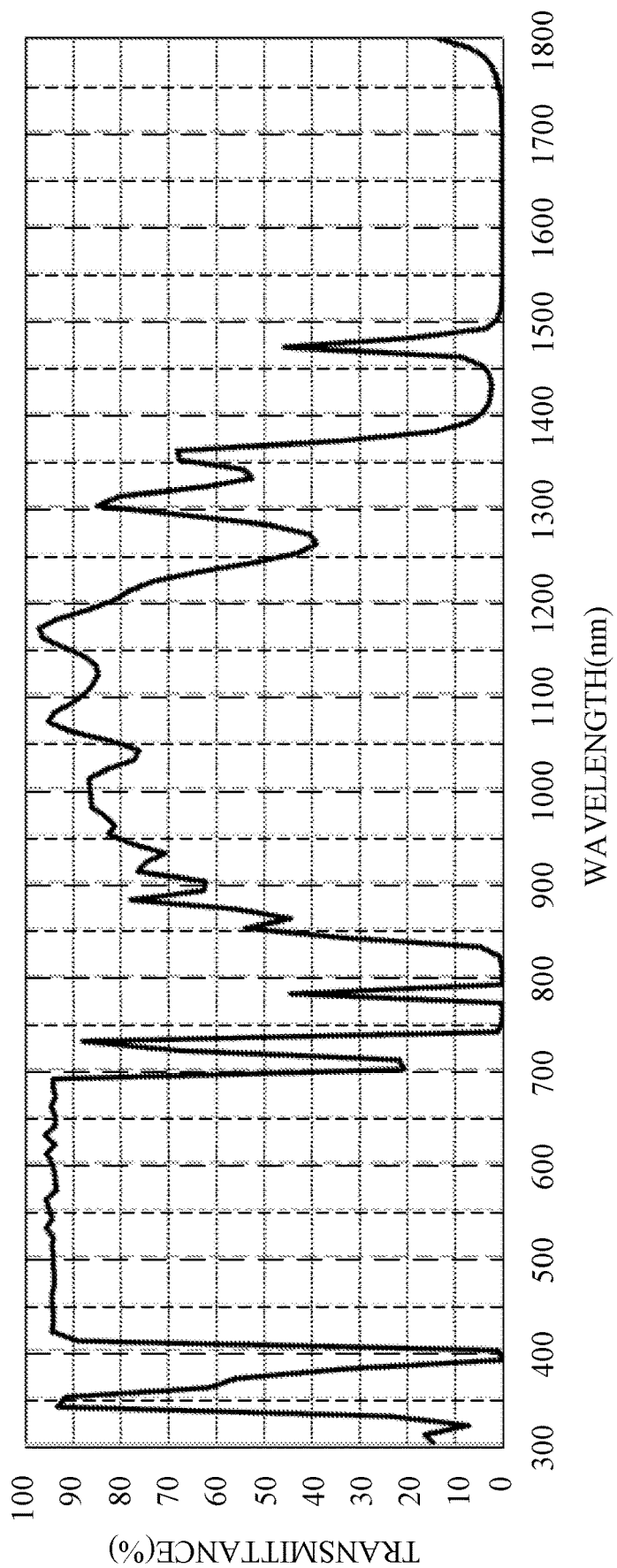
FIG. 22 illustrates a transmittance characteristic of a fourth 1550 nm cutting film (Example 10).

Tables 9, 10, and 11 show the film structures of the second, third, and fourth 1550 nm cutting films, respectively. FIGS. 20, 21, and 22 illustrate the transmittance characteristics of the second, third, and fourth 1550 nm cutting films, respectively.

The refractive indices of the film materials M3, H2, and L1 of the second, third, and fourth 1550 nm cutting films satisfy the expressions (1) to (3), respectively. There are at least 6 or more integers i that satisfy the expressions (4) and (5) in the second and third 1550 nm cutting films and there are at least 4 or more integers i that satisfy the expressions (4) and (5) in the fourth 1550 nm cutting film. Therefore, each 1550 nm cutting film can obtain desired characteristic.

TABLE 9

| Layer | Material | Refractive index | Optical film thickness (nm) |
|---|---|---|---|
| 41st | L1 | 1.38 | 110.1 |
| 40th | H2 | 2.3 | 508.7 |
| 39th | M3 | 1.63 | 259.3 |
| 38th | H2 | 2.3 | 494.7 |
| 37th | M3 | 1.63 | 258.3 |
| 36th | H2 | 2.3 | 493.9 |
| 35th | M3 | 1.63 | 265.7 |
| 34th | H2 | 1.3 | 500.2 |
| 33rd | M3 | 1.63 | 251.0 |
| 32nd | H2 | 2.3 | 516.4 |
| 31st | M3 | 1.63 | 266.6 |
| 30th | M2 | 2.3 | 524.2 |
| 29th | M3 | 1.63 | 281.2 |
| 28th | H2 | 2.3 | 524.4 |
| 27th | M3 | 1.63 | 268.7 |
| 26th | H2 | 2.3 | 519.8 |
| 25th | M3 | 1.63 | 290.0 |
| 24th | H2 | 2.3 | 539.8 |
| 23rd | M3 | 1.63 | 280.9 |
| 22nd | H2 | 2.3 | 545.7 |
| 21st | M3 | 1.63 | 260.6 |
| 20th | H2 | 2.3 | 531.6 |
| 19th | M3 | 1.63 | 284.2 |
| 18th | H2 | 2.3 | 705.5 |
| 17th | M3 | 1.83 | 270.7 |
| 16th | H2 | 2.3 | 512.1 |
| 15th | M3 | 1.63 | 255.9 |

TABLE 9-continued

| Layer | Material | Refractive index | Optical film thickness (nm) |
|---|---|---|---|
| 14th | H2 | 2.3 | 511.1 |
| 13th | M3 | 1.63 | 261.4 |
| 12th | H2 | 2.3 | 518.2 |
| 11th | M3 | 1.63 | 279.5 |
| 10th | H2 | 2.3 | 517.8 |
| 9th | M3 | 1.63 | 268.4 |
| 8th | H2 | 2.3 | 510.4 |
| 7th | M3 | 1.63 | 259.5 |
| 6th | H2 | 2.3 | 494.6 |
| 5th | M3 | 1.63 | 251.5 |
| 4th | H2 | 2.3 | 509.4 |
| 3rd | M3 | 1.63 | 271.3 |
| 2nd | H2 | 2.3 | 525.6 |
| 1st | M3 | 1.63 | 102.5 |
| Substrate | S1 | 1.52 | |

TABLE 10

| Layer | Material | Refractive index | Optical film thickness (nm) |
|---|---|---|---|
| 41st | L1 | 1.38 | 131.7 |
| 40th | H1 | 2.12 | 546.4 |
| 39th | M1 | 1.46 | 258.7 |
| 38th | H1 | 2.12 | 520.2 |
| 37th | M1 | 1.46 | 253.0 |
| 36th | H1 | 2.12 | 501.2 |
| 35th | M1 | 1.46 | 271.8 |
| 34th | H1 | 2.12 | 504.0 |
| 33rd | M1 | 1.46 | 264.3 |
| 32nd | H1 | 2.12 | 508.9 |
| 31st | M1 | 1.46 | 267.5 |
| 30th | H1 | 2.12 | 530.4 |
| 29th | M1 | 1.46 | 272.1 |
| 28th | H1 | 2.12 | 527.6 |
| 27th | M1 | 1.46 | 268.3 |
| 26th | H1 | 2.12 | 521.5 |
| 25th | M1 | 1.46 | 287.6 |
| 24th | H1 | 2.12 | 543.2 |
| 23rd | M1 | 1.46 | 271.4 |
| 22nd | H1 | 2.12 | 547.3 |
| 21st | M1 | 1.46 | 257.4 |
| 20th | H1 | 2.12 | 524.2 |
| 19th | M1 | 1.46 | 284.1 |
| 18th | H1 | 2.12 | 709.4 |
| 17th | M1 | 1.46 | 267.4 |
| 16th | H1 | 2.12 | 508.2 |
| 15th | M1 | 1.46 | 247.8 |
| 14th | H1 | 2.12 | 514.5 |
| 13th | M1 | 1.46 | 260.2 |
| 12th | H1 | 2.12 | 509.0 |
| 11th | M1 | 1.46 | 271.4 |
| 10th | H1 | 2.12 | 511.2 |
| 9th | M1 | 1.46 | 271.0 |
| 8th | H1 | 2.12 | 524.6 |
| 7th | M1 | 1.46 | 259.9 |
| 6th | H1 | 2.12 | 514.4 |
| 5th | M1 | 1.46 | 250.1 |
| 4th | H1 | 2.12 | 530.5 |
| 3rd | M1 | 1.46 | 264.3 |
| 2nd | H1 | 2.12 | 510.7 |
| 1st | M1 | 1.46 | 20.9 |
| Substrate | S2 | 1.7 | |

TABLE 11

| Layer | Material | Refractive index | Optical film thickness (nm) |
|---|---|---|---|
| 31st | M1 | 1.46 | 391.0 |
| 30th | H1 | 2.12 | 543.0 |
| 29th | M1 | 1.46 | 245.1 |

TABLE 11-continued

| Layer | Material | Refractive index | Optical film thickness (nm) |
|---|---|---|---|
| 28th | H1 | 2.12 | 504.6 |
| 27th | M1 | 1.46 | 266.8 |
| 26th | H1 | 2.12 | 503.6 |
| 25th | M1 | 1.46 | 256.3 |
| 24th | H1 | 2.12 | 541.3 |
| 23rd | M1 | 1.46 | 273.7 |
| 22nd | H1 | 2.12 | 519.5 |
| 21st | M1 | 1.46 | 260.2 |
| 20th | H1 | 2.12 | 533.2 |
| 19th | M1 | 1.46 | 272.2 |
| 18th | H1 | 2.12 | 705.1 |
| 17th | M1 | 1.46 | 271.6 |
| 16th | H1 | 2.12 | 506.6 |
| 15th | M1 | 1.46 | 265.2 |
| 14th | H1 | 2.12 | 512.8 |
| 13th | M1 | 1.48 | 255.7 |
| 12th | H1 | 2.12 | 522.6 |
| 11th | M1 | 1.46 | 270.1 |
| 10th | H1 | 2.12 | 543.5 |
| 9th | M1 | 1.48 | 271.5 |
| 8th | H1 | 2.12 | 519.1 |
| 7th | M1 | 1.46 | 248.3 |
| 6th | H1 | 2.12 | 506.1 |
| 5th | M1 | 1.46 | 253.5 |
| 4th | H1 | 2.12 | 499.1 |
| 3rd | M1 | 1.48 | 257.5 |
| 2nd | H1 | 2.12 | 543.3 |
| 1st | M1 | 1.48 | 15.0 |
| Substrate | S1 | 1.52 | |

Comparative Example

Figure 23:
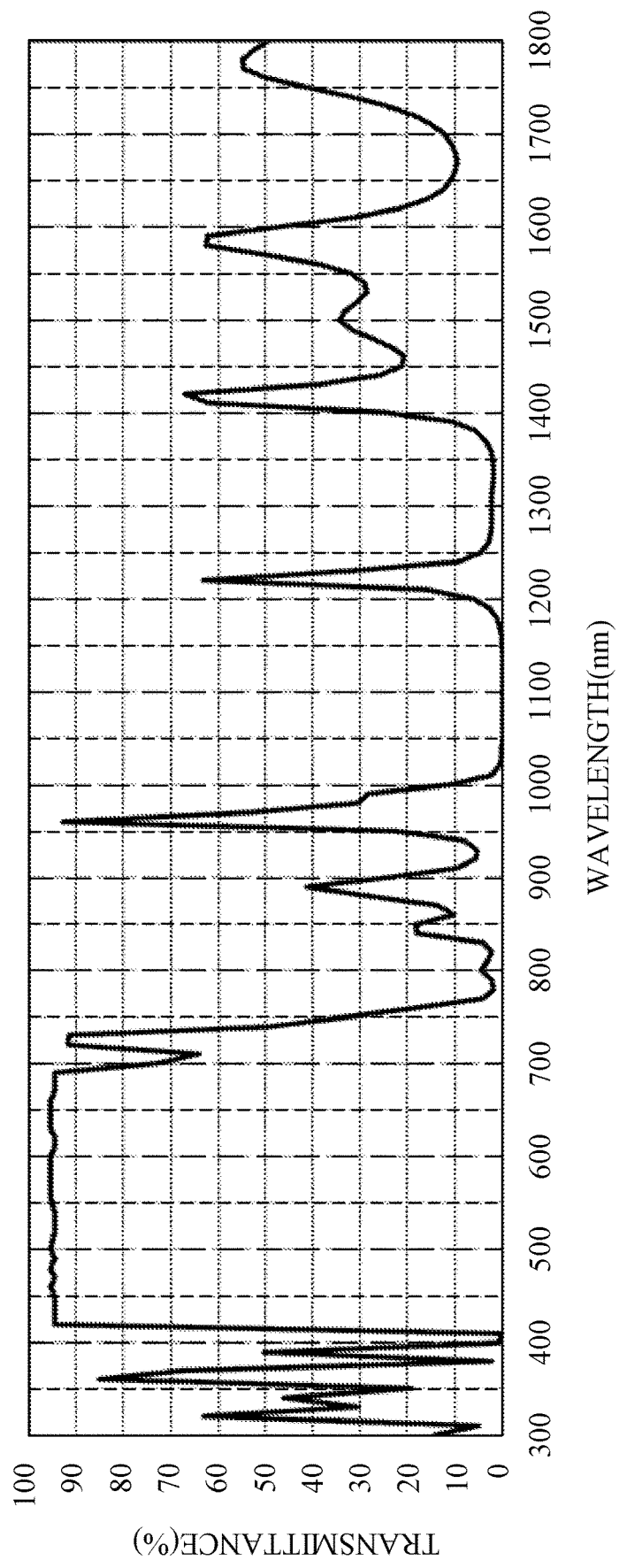
FIG. 23 illustrates a transmittance characteristic of a first comparative optical multilayer film (Comparative Example).
Figure 24:
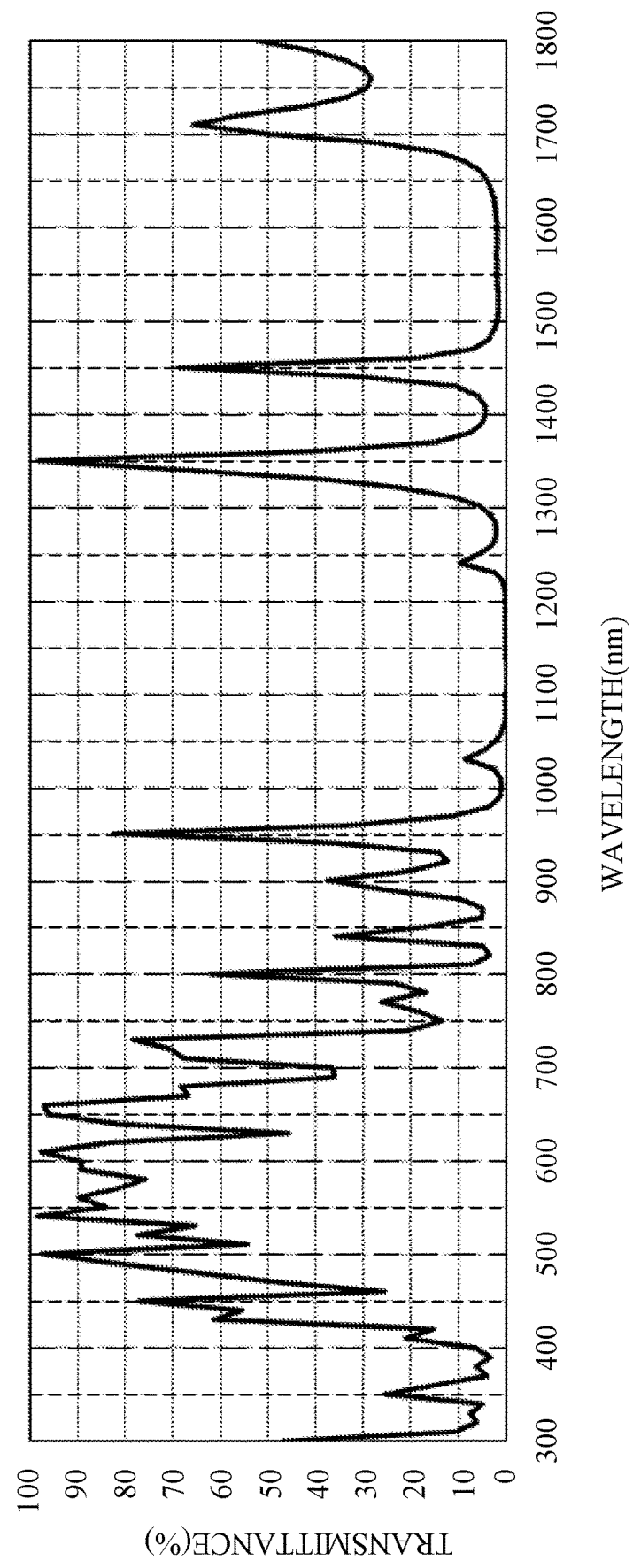
FIG. 24 illustrates a transmittance characteristic of a second comparative optical multilayer film (Comparative Example).

Tables 12 and 13 show the film structures of the first and second comparative optical multilayer films of the first to fourth 1550 nm cutting films described in Examples 1 to 10. FIGS. 23 and 24 illustrate the transmittance characteristics of the first and second comparative optical multilayer films, respectively.

In the comparative optical multilayer films, the number of integers i that satisfy the expressions (4) and (5) does not become 6 or more. Therefore, the first comparative optical multilayer film has an average transmittance of 75% or higher at the wavelength of 470 nm to 630 nm, but has a transmittance of 10% or higher at the wavelength of 1550 nm. The second comparative optical multilayer film 2 has the transmittance of 10% or lower at the wavelength of 1550 nm. However, in the wavelength band from 470 nm to 630 nm, its transmittance significantly scatters for each wavelength, and the average transmittance is 75% or lower.

TABLE 12

| Layer | Material | Refractive index | Optical film thickness (nm) |
|---|---|---|---|
| 41st | L1 | 1.38 | 126.7 |
| 40th | H2 | 2.3 | 245.7 |
| 39th | M3 | 1.63 | 244.7 |
| 38th | H2 | 2.3 | 299.7 |
| 37th | M3 | 1.63 | 303.7 |
| 36th | H2 | 2.3 | 314.5 |
| 35th | M3 | 1.63 | 275.0 |
| 34th | H2 | 2.3 | 297.6 |
| 33rd | M3 | 1.63 | 308.3 |
| 32nd | H2 | 2.3 | 289.3 |
| 31st | M3 | 1.63 | 293.7 |
| 30th | H2 | 2.3 | 333.2 |
| 29th | M3 | 1.63 | 32.9 |
| 28th | H2 | 2.3 | 359.3 |
| 27th | M3 | 1.63 | 263.1 |

TABLE 12-continued

| Layer | Material | Refractive index | Optical film thickness (nm) |
|---|---|---|---|
| 26th | H2 | 2.3 | 246.3 |
| 25th | M3 | 1.63 | 242.3 |
| 24th | H2 | 2.3 | 266.6 |
| 23rd | M3 | 1.63 | 299.1 |
| 22nd | H2 | 2.3 | 295.5 |
| 21st | M3 | 1.63 | 305.0 |
| 20th | H2 | 2.3 | 295.9 |
| 19th | M3 | 1.63 | 299.9 |
| 18th | H2 | 2.3 | 293.5 |
| 17th | M3 | 1.63 | 264.8 |
| 16th | H2 | 2.3 | 216.3 |
| 15th | M3 | 1.63 | 223.3 |
| 14th | H2 | 2.3 | 204.9 |
| 13th | M3 | 1.63 | 288.2 |
| 12th | H2 | 2.3 | 192.6 |
| 11th | M3 | 1.63 | 238.2 |
| 10th | H2 | 2.3 | 522.5 |
| 9th | MS | 1.63 | 257.9 |
| 8th | H2 | 2.3 | 541.9 |
| 7th | M3 | 1.63 | 264.3 |
| 6th | H2 | 2.3 | 542.7 |
| 5th | M3 | 1.63 | 260.4 |
| 4th | H2 | 2.3 | 539.8 |
| 3rd | M3 | 1.63 | 258.9 |
| 2nd | H2 | 2.3 | 23.2 |
| 1st | M3 | 1.63 | 15.0 |
| Substrate | S1 | 1.52 | |

TABLE 13

| Layer | Material | Refractive index | Optical film thickness (nm) |
|---|---|---|---|
| 41st | L1 | 1.38 | 128.2 |
| 40th | H2 | 2.3 | 247.2 |
| 39th | M3 | 1.63 | 263.7 |
| 38th | H2 | 2.3 | 273.9 |
| 37th | M3 | 1.63 | 284.4 |
| 36th | H2 | 2.3 | 295.4 |
| 35th | M3 | 1.63 | 299.4 |
| 34th | H2 | 2.3 | 255.2 |
| 33rd | M3 | 1.63 | 185.8 |
| 32nd | H2 | 2.3 | 224.5 |
| 31st | M3 | 1.63 | 256.2 |
| 30th | H2 | 2.3 | 297.9 |
| 29th | M3 | 1.63 | 341.7 |
| 28th | H2 | 2.3 | 307.7 |
| 27th | M3 | 1.63 | 274.3 |
| 26th | H2 | 2.3 | 250.6 |
| 25th | MS | 1.63 | 231.1 |
| 24th | H2 | 2.3 | 220.4 |
| 23rd | M3 | 1.63 | 267.0 |
| 22nd | H2 | 2.3 | 371.2 |
| 21st | M3 | 1.63 | 388.5 |
| 20th | H2 | 2.3 | 312.9 |
| 19th | M3 | 1.63 | 273.4 |
| 18th | H2 | 2.3 | 260.8 |
| 17th | M3 | 1.63 | 257.3 |
| 16th | H2 | 2.3 | 255.5 |
| 15th | M3 | 1.63 | 264.9 |
| 14th | H2 | 2.3 | 355.6 |
| 13th | M3 | 1.63 | 300.0 |
| 12th | H2 | 2.3 | 400.0 |
| 11th | M3 | 1.63 | 238.2 |
| 10th | H2 | 2.3 | 522.5 |
| 9th | M3 | 1.63 | 257.9 |
| 8th | H2 | 2.3 | 541.9 |
| 7th | M3 | 1.63 | 264.3 |
| 6th | H2 | 2.3 | 542.7 |
| 5th | M3 | 1.63 | 260.4 |
| 4th | H2 | 2.3 | 539.8 |
| 3rd | M3 | 1.63 | 258.9 |
| 2nd | H2 | 2.3 | 400.0 |
| 1st | M3 | 1.63 | 15.3 |

TABLE 13-continued

| Layer | Material | Refractive index | Optical film thickness (nm) |
|---|---|---|---|
| Substrate | S1 | 1.52 | |

The above embodiment can provide an optical element, an optical system, and an image pickup apparatus, each of which can cut the light having the wavelength of 1550 nm while maintaining a high transmittance in the visible range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-107242, filed on Jun. 7, 2019, which is hereby incorporated by reference herein in its entirety.

What is claimed is:

1. An optical element comprising:
   a substrate; and
   a multilayer film provided on the substrate,
   wherein the multilayer film has an average transmittance of 75% or higher for light having a wavelength of 470 nm to 630 nm incident at an incident angle of 0° and a transmittance of 10% or lower for light having a wavelength of 1550 nm incident at an incident angle of 0°,
   wherein the multilayer film includes a layer made of a first material and a layer made of a second material alternately layered, and a final layer made of a third material disposed on an outermost side, and
   wherein the following conditional expressions are satisfied:

$$1.35 \leq n_m \leq 1.80$$

$$1.90 \leq n_h \leq 2.50$$

$$1.15 \leq n_l \leq 1.50$$

where $n_m$ is a refractive index of the first material, $n_h$ is a refractive index of the second material, and $n_l$ is a refractive index of the third material.

2. The optical element according to claim 1, wherein the average transmittance of the multilayer film for light having a wavelength of 420 nm to 680 nm incident at the incident angle of 0° is 80% or higher.

3. The optical element according to claim 1, wherein a difference between a maximum reflectance and a minimum reflectance of the multilayer film at a wavelength of 470 nm to 630 nm is within 8%.

4. The optical element according to claim 1, wherein the multilayer film has a band where the transmittance is 10% or lower at a wavelength of 700 nm to 1000 nm.

5. The optical element according to claim 1, wherein the multilayer film has 14 to 81 layers inclusive.

6. The optical element according to claim 1, wherein there are m/8 or more integers that satisfy the following conditional expressions:

$$480 \leq d_{2i-1} \leq 600$$

$$1.8 \leq d_{2i}/d_{2i-1} \leq 2.2$$

where m is an order of a layer in the multilayer film counted from a side of the substrate, i is an integer satisfying $2 \leq i \leq (m-1)/2$, $d_{2i-1}$ (nm) is an optical thickness of a (2i−1)-th layer, and $d_{2i}$ (nm) is an optical thickness of a 2i-th layer.

7. The optical element according to claim 1, wherein the transmittance of the multilayer film at the wavelength of 1550 nm is 5% or lower.

8. An optical element comprising:
a substrate; and
a multilayer film provided on the substrate,
wherein the multilayer film has an average transmittance of 75% or higher for light having a wavelength of 470 nm to 630 nm incident at an incident angle of 0° and a transmittance of 10% or lower for light having a wavelength of 1550 nm incident at an incident angle of 0°,
wherein there are m/8 or more integers that satisfy the following conditional expressions:

$$480 \leq d_{2i-1} \leq 600$$

$$1.8 \leq d_{2i}/d_{2i-1} \leq 2.2$$

where m is an order of a layer in the multilayer film counted from a side of the substrate, i is an integer satisfying $2 \leq i \leq (m-1)/2$, $d_{2i-1}$ (nm) is an optical thickness of a (2i−1)-th layer, and $d_{2i}$ (nm) is an optical thickness of a 2i-th layer.

9. An optical system comprising a plurality of optical elements,
wherein the plurality of optical elements includes the optical element according to claim 1.

10. An image pickup apparatus comprising:
the optical element according to claim 1; and
an image sensor configured to receive light from the optical element.

* * * * *